(12) United States Patent
Yamazaki

(10) Patent No.: US 9,897,709 B2
(45) Date of Patent: Feb. 20, 2018

(54) IMAGING APPARATUS AND RADIOGRAPHIC IMAGING SYSTEM

(71) Applicant: CANON KABUSHIKI KAISHA, Tokyo (JP)

(72) Inventor: Takashi Yamazaki, Tsurugashima (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/492,995

(22) Filed: Apr. 20, 2017

(65) Prior Publication Data

US 2017/0315245 A1    Nov. 2, 2017

(30) Foreign Application Priority Data

Apr. 28, 2016   (JP) ................................ 2016-091611

(51) Int. Cl.
*G01T 1/24*   (2006.01)
(52) U.S. Cl.
CPC .................................... *G01T 1/247* (2013.01)
(58) Field of Classification Search
CPC .. G01T 1/247; G01T 1/24; G01T 1/17; G01T 1/00; H04N 5/335; H01L 27/146; G01N 23/04
See application file for complete search history.

(56) References Cited

U.S. PATENT DOCUMENTS

| | | |
|---|---|---|
| 2012/0187303 A1 | 7/2012 | Okada |
| 2012/0200753 A1 | 8/2012 | Endoh |
| 2013/0107092 A1 | 5/2013 | Minami |
| 2013/0322596 A1* | 12/2013 | Inoue ........................ G01T 1/17 378/62 |
| 2016/0015358 A1 | 1/2016 | Yagi |

FOREIGN PATENT DOCUMENTS

| | | |
|---|---|---|
| JP | 11-069231 A | 3/1999 |
| JP | 2013162164 A | 8/2013 |
| JP | 2015012546 A | 1/2015 |

* cited by examiner

*Primary Examiner* — David Porta
*Assistant Examiner* — Faye Boosalis
(74) *Attorney, Agent, or Firm* — Canon U.S.A., Inc. IP Division

(57) ABSTRACT

An imaging apparatus includes a plurality of pixels arranged in a matrix form, each pixel being configured to generate an electric signal, and each being configured such that the electric signal can be read out nondestructively, an output amplifier configured to sequentially output electric signals read out nondestructively from the plurality of pixels, and a control unit configured to, in a period when electric signals for one frame of image data are being read out nondestructively from the plurality of pixels, execute nondestructive readout processing a plurality of times for reading out electric signals nondestructively from pixels in a first row, and execute nondestructive readout processing a plurality of times for reading out electric signals nondestructively from pixels in a second row adjacent to the first row. In this case, the control unit resets the output amplifier in a period when the nondestructive readout processing is performed a plurality of times on the pixels of the first row.

16 Claims, 16 Drawing Sheets

IMAGING APPARATUS AND RADIOGRAPHIC IMAGING SYSTEM

BACKGROUND OF THE INVENTION

Field of the Invention

The present disclosure relates to an imaging apparatus and a radiographic imaging system.

Description of the Related Art

An imaging apparatus applied in a radiographic imaging system has a plurality of pixels arranged in a matrix form and each configured to output an electric signal depending on radiation or light. Such an imaging apparatus further has a plurality of row-selection lines arranged in a column direction and electrically connected to a plurality of pixels in a row direction, and a plurality of column signal lines arranged in the row direction and electrically connected to a plurality of pixels in the column direction. The plurality of column signal lines is electrically connected to an output signal line through a column-selection switch, and an output amplifier is electrically connected to the output signal line and is configured to perform impedance conversion on a signal transmitted to the output signal line. A row-selection circuit electrically connected to a plurality of row-selection lines selects a plurality of pixels row by row. During a period in which a plurality of pixels in one row is being selected, a column-selection circuit electrically connected to a plurality of column-selection switches outputs electric signals sequentially from the pixels in the row through the output signal line and the output amplifier.

Relating to such an imaging apparatus, Japanese Patent Laid-Open No. 11-069231 discloses that a requested reference voltage is supplied to an input of the output amplifier during a period from output of an electric signal from a pixel in a finally selected column. of one row to output of an electric signal from a pixel in a first selected column of the next row. Because the pixel in the finally selected column and the pixel in the first selected column are positioned far away from each other, electric signals output from these pixels may differ largely. In such a case, the electric signal from the pixel in the finally selected column may have an influence on the electric signal from the pixel in the first selected column. Particularly on a case where the imaging apparatus scans at a high scanning speed and the output amplifier does not have a sufficient settling time, the influence may possibly appear as an image artifact. In this case in particular, supplying a requested reference voltage every time an electric signal is output from the pixel may make the settling time of the output amplifier significantly insufficient. Accordingly, in order to reduce the influence, a requested reference voltage may be supplied to the input of the output amplifier during the period to reset the output amplifier.

On the other hand, an imaging apparatus has been known which has pixels from which electric signals depending on radiation or light can be nondestructively read out (or output). Japanese Patent Laid-Open No. 2013-162164 discloses an imaging apparatus having a plurality of pixels which are arranged in a matrix and on which nondestructive readout can be performed in which electric signals are nondestructively read out from pixels of one row a plurality of number of times during a period in which the pixels in the row are being selected. This processing is called multiple nondestructive readout processing. Japanese Patent Laid-Open No. 2013-162164 discloses that electric signals nondestructively read a plurality of number of times are averaged to reduce noise. Japanese Patent Laid-Open No. 2015-012546 discloses an imaging apparatus having a plurality of pixels which is arranged in a matrix form and on which multiple nondestructive readout can be performed with different sensitivities. Japanese Patent Laid-Open No. 2015-012546 discloses that an image can be acquired which has a dynamic range extended on the basis of electric signals acquired by multiple nondestructive readout performed during a period when pixels in one row are being selected.

However, imaging apparatuses in which electric signals are nondestructively read a plurality of number of times from pixels in one row during a period in which the pixels in the row are being selected as in Japanese Patent Laid-Open No. 2013-162164 and Japanese Patent Laid-Open No. 2015-012546 may need consideration regarding how an output amplifier therein is to be reset.

SUMMARY OF THE INVENTION

Accordingly, the present disclosure provides an imaging apparatus in which electric signals can be nondestructively read a plurality of number of times from pixels in one row during a period the pixels in the row are being selected, and which has a sufficient settling time to inhibit an image artifact due to the influence. An imaging apparatus according to an aspect of the present disclosure includes a plurality of pixels arranged in a matrix form, the plurality of pixels each being configured to generate an electric signal depending on radiation or light, and being configured such that the electric signal can be read out nondestructively, an output amplifier configured to sequentially output electric signals read out nondestructively from the plurality of pixels, and a control unit configured to, in a period when electric signals from one frame of image data are being read out nondestructively from the plurality of pixels, execute nondestructive readout processing a plurality of times for reading out electric signals nondestructively from pixels of a first row of the plurality of pixels and execute nondestructive readout processing a plurality of times for reading out electric signals nondestructively from pixels of a second row adjacent to the first row. In this case, the control unit resets the output amplifier in a period when the nondestructive readout processing is performed a plurality of times on the pixels of the first row Further features of the present invention will become apparent from the following description of exemplary embodiments with reference to the attached drawings. Each of the embodiments of the present invention described. below can be implemented solely or as a combination of a plurality of the embodiments or features thereof where necessary or where the combination of elements or features from individual embodiments in a single embodiment is beneficial.

DESCRIPTION OF THE EMBODIMENTS

Modes for embodying the present disclosure will be described in detail below with reference to drawings. It should be noted that radiation may typically be an X-ray but may be an α ray, a β ray or a γ ray.

First Embodiment

Figure 1:
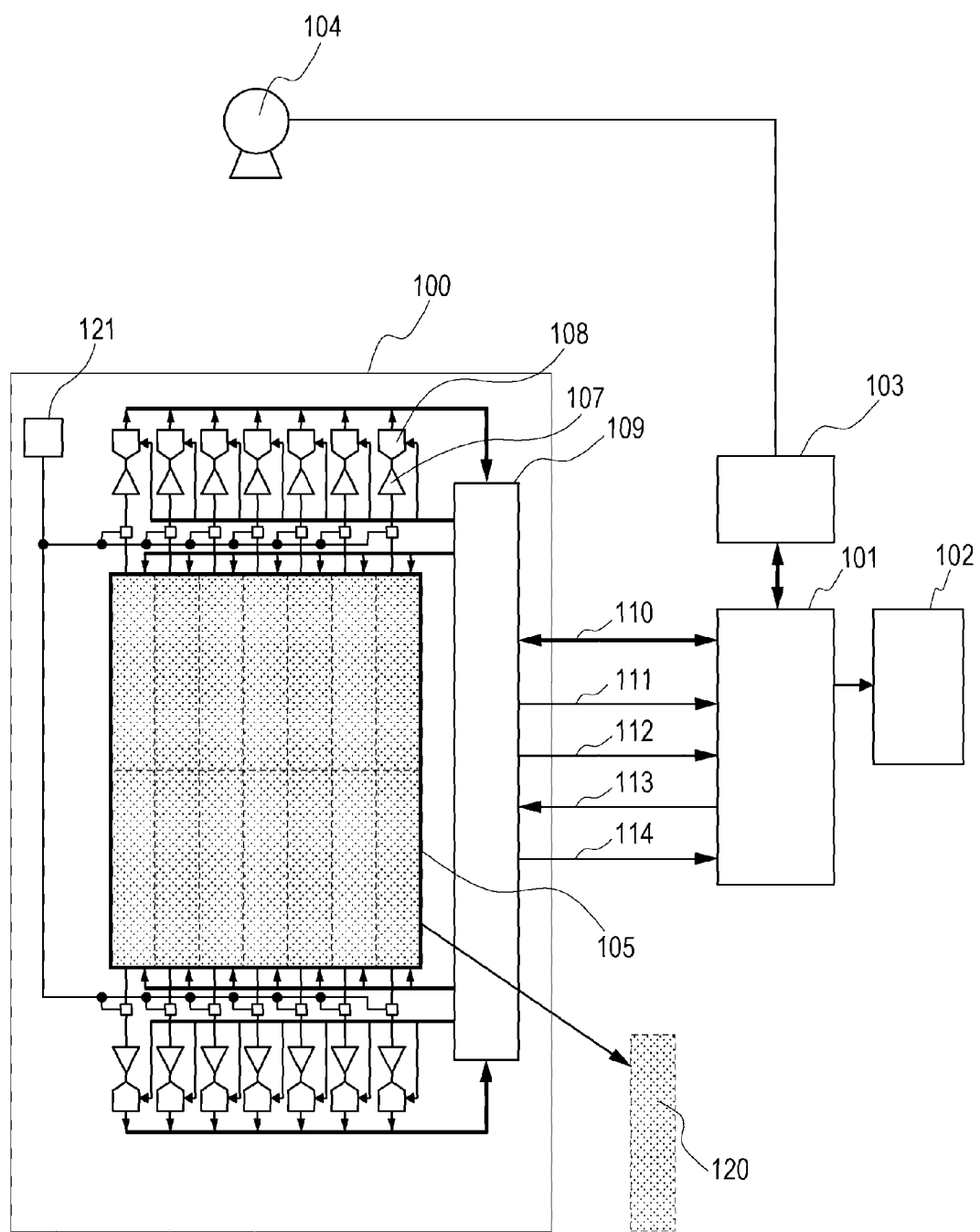
FIG. 1 is a schematic block diagram illustrating a radiographic imaging system according to a first embodiment.

First, a radiographic imaging system including an imaging apparatus will be described with reference to FIG. 1. FIG. 1 is a schematic block diagram of the radiographic imaging system.

FIG. 1 illustrates an imaging apparatus 100, an image processing device 101, an image display apparatus 102, an X-ray generator (radiation generator) 103, and an X-ray tube 104. In photographing, a control device (not shown) controls such that the imaging apparatus 100 and the X.-ray generator 103 can synchronize with each other. An X-ray having transmitted through an object is converted to visible light by a scintillator, not illustrated, is photoelectrically converted on the basis of light quantity, and is then A/D converted. After that, the frame image data corresponding to the X-ray irradiation are transferred from the imaging apparatus 100 to the image processing device 101. After the transferred frame image data undergoes image processing, the resulting radiographic image is displayed on the image display apparatus 102 in real time.

The imaging apparatus 100 internally contains a fiat panel. sensor 105. The flat panel sensor 105 has rectangular semiconductor substrates 120 (e.g. shown in FIG. 4) tiled in a matrix of seven columns x two rows on a base, not illustrated. Each of the semiconductor substrates 120 is an imaging substrate having a single crystal semiconductor such as a silicon semiconductor wafer and includes a plurality of pixels arranged in a matrix form. The semiconductor substrates 120 functioning as joint area sensors have thereon pixels arranged two-dimensionally at equal pitches. The pixels are tiled at equal pitches across boundaries between the semiconductor substrates 120. External circuit substrates are connected to an upper edge and a lower edge of the flat panel sensor 105 through external terminals (electrode pads) arranged in a matrix form. Here, the imaging apparatus 100 further includes a voltage supply unit 121 configured to supply a reference voltage. The voltage supply unit 121 will be described in detail below.

A control unit 109 is configured to communicate a control command and a synchronizing signal with the image processing device 101 and to transmit image data to the image processing device 101. The imaging control unit 109 may also have a control function for the flat panel sensor and is configured to control driving of the flat panel sensor and control photographing modes. The imaging control unit 109 is configured to synthesize A/D converted digital image data from a plurality of A/D converters 108 within the imaging apparatus 100 to frame data, and transfer the resulting data to the image processing device 101. The imaging control unit 109 corresponds to a control circuit according to the present disclosure.

A command control interface 110 is usable for communicating photographing mode settings, parameter settings, a photographing start setting, and a photographing completion setting from the image processing device 101 to the imaging control unit 109 and for communicating a state of the imaging apparatus, for example, from the imaging control unit 109 to the image processing device 101. An image data interface 111 is usable for transmitting acquired image data from the imaging control unit 109 to the image processing device 101. A READY signal 112 is a signal indicating that a state that the imaging apparatus 100 is ready for photographing has been acquired, which is informed from the imaging control unit 109 to the image processing device 101. An external synchronizing signal 113 is a signal informing a time point for X-ray exposure to the imaging control unit 109 when the image processing device 101 receives the READY signal 112 from the imaging control unit 109. While an exposure permission signal 114 is being enabled, an exposure signal is transmitted from the image processing device 101 to the ray generator 103.

Next, an example of a configuration of one pixel in the imaging apparatus will be described with reference to FIG. 2. A pixel P may include a converting unit CP, an amplifying unit AP, a reset unit RP, a first holding unit SH1, a second holding unit SH2, a third holding unit SH3, a first output unit OP1, a second output unit OP2, and a third output unit OP3.

The converting unit CP may have a photodiode PD, a transistor M1, a floating diffusion capacitor $C_{FD}$ (hereinafter, called FD capacitor $C_{FD}$), and a sensitivity switching added capacitor $C_{FD}'$. The photodiode PD is a photoelectric conversion element and is configured to convert light generated depending on irradiated radiation in a scintillator being a wavelength. conversion element to an electric signal. In other words, the converting unit may have conversion elements including a wavelength conversion element configured to convert radiation to light and a photoelectric conversion element configured to convert light to electric charges. However, a conversion element configured to directly convert radiation to electric charges may be provided instead. More specifically, charges of an amount depending on the light are generated in the photodiode PD, and voltage in the FD capacitor $C_{FD}$ depending on the amount of generated electric charges is output to the amplifying unit AP. The sensitivity switching capacitor $C_{FD}'$ is used for switching the sensitivity to radiation to the pixel P and is connected to the photodiode PD through the transistor M1 (switch element). Activation of a WIDE signal brings the transistor Mi into a conductive state, and voltage of a synthesized capacitance of the FD capacitor $C_{FD}$ and the capacitor $C_{FD}'$ is output to the amplifying unit AP. In other words, the conductive state of the transistor MI may be controlled so that a first signal being voltage dependent on the charges converted by the converting unit CP having a first sensitivity, and a second signal being voltage dependent on charges converted by a converting unit having a second sensitivity different from the first sensitivity can be output to the amplifying unit AP.

The amplifying unit AS has a first control transistor M3, a first amplification transistor M4, a clamp capacitor $C_{CL}$, a second control transistor M6, a second amplification transistor M7, and constant current sources. The first control transistor M3, the first amplification transistor M4, and the constant current sources (such as a transistor having a current mirror configuration) are serially connected to form a current path. Activation of an enable signal EN to be input to a gate of the first control transistor M3 changes the operating status of the first amplification transistor M4 which receives voltage from the converting unit CP. Thus, a source follower circuit is formed so that voltage acquired by amplifying voltage from the converting unit CP can be output from the first amplification transistor M4. The voltage output from the first amplification transistor M4 is input to the second amplification transistor M7 through the clamp capacitor $C_{CL}$. The second control transistor M6, the second amplification transistor M7, and the constant current sources are serially connected to form a current path. Activation of an enable signal EN to be input to a gate of the second control transistor M6 changes the operating status of the first amplification transistor M4 which receives voltage from the first amplification transistor M4. Thus, a source follower circuit is formed so that voltage acquired by amplifying voltage from the firs. amplification transistor M4 can be output from the second amplification transistor M7. The clamp capacitor $C_{CL}$ is connected serially between the first amplification transistor M4 and the second amplification transistor M7. A clamp operation to be performed by the clamp capacitor $C_{CL}$ will be described along with description of a reset unit RP, which will be described below.

The reset unit RP includes a first reset transistor M2 and a second reset transistor M5. In response to activation of a PRES signal, the first reset transistor M2 supplies a predetermined potential to the photodiode PD, initializes charges in the photodiode PD, and resets voltage to be output to the amplifying unit AP. The second reset transistor M15 supplies a predetermined potential to a connection node between the clamp capacitor $C_{CL}$ and a second amplification transistor M7 so that voltage to be output from the second amplification transistor M7 can be reset. The voltage depending on the voltage from the converting unit CP upon reset caused by the first reset transistor M2 is input to a terminal n1 of the clamp capacitor $C_{CL}$. Activation of a clamp signal PCL brings the second reset transistor M5 into a conductive state, and a clamp voltage VCL being a predetermined potential is input to a terminal n2 of the clamp capacitor $C_{CL}$. This causes clamping with a noise component being a potential difference between the terminals n1 and n2 of the clamp capacitor $C_{CL}$, and an amount of change in voltage caused by subsequent occurrence and accumulation of charges in the photodiode PD is output as a signal component. This corresponds to a clamp operation using the clamp capacitor $C_{CL}$, and the clamp operation can suppress a noise component such as kTC noise occurring in the converting unit CP and an offset in the first amplification transistor M4.

The first. holding unit SH1 is a sample hold circuit configured to hold a first signal acquired by amplifying, by the amplifying unit AP, charges converted by the converting unit CP having a first sensitivity and includes a first transfer transistor M8 and a first holding capacitor CS1. More specifically, the state (conductive state or non-conductive state) of the first transfer transistor M8 is switched by using a control signal TS1 so that sampling can be performed in which a first signal acquired by amplifying, by the amplifying unit AP, charges converted by the converting unit CP having the first sensitivity is transferred to and is held in the capacitor CS1. The first output unit OP1 includes a first signal amplification transistor M10 and a first output switch SW9. The first signal amplification transistor M10 is a transistor configured to output a signal acquired by amplifying voltage held in the first holding capacitor CS1. The first output switch SW9 is a switch configured to transfer a signal output from the first signal amplification transistor M10. More specifically, a control signal VSR input to the first output, switch SW9 brings the first output switch SW9 into a conductive state so that a constant current source (not illustrated) and the first signal amplification transistor M10 in the subsequent stage can form a source follower circuit. Thus, through the first output unit OP1, the pixel P can output a first output signal S1 based on the first signal or voltage held in the first holding capacitor CS1.

The second holding unit SH2 is a sample hold circuit configured to hold a second signal acquired by amplifying, by the amplifying unit AP, charges converted by a converting unit CP having a second sensitivity different from the first sensitivity and includes a second transfer transistor M11 and a second holding capacitor CS2. More specifically, the state (conductive state or non-conductive state) of the second transfer transistor M11 is switched by using a control signal TS2 so that sampling can be performed in which a second signal acquired by amplifying, by the amplifying unit AP, charges converted by the converting unit CP having the second sensitivity is transferred to and is held in the capacitor CS2. The second output unit OP2 includes a second signal amplification transistor M13 and a second output switch SW12. The second signal amplification transistor M13 is a transistor configured to output a signal acquired by amplifying voltage held in the second holding capacitor CS2. The second output switch SW12 is a switch configured to transfer a signal output from the second signal amplification transistor M13. More specifically, a control signal VSR input to the second output switch SW12 brings the second output switch SW12 into a conductive state so that a constant current source (not illustrated) and the second signal amplification transistor M13 in the subsequent stage can form a source follower circuit. Thus, through the second output unit OP2, the pixel P can output a second output signal S2 based on the second signal or voltage held in the second holding capacitor CS2.

The third holding unit SH3 is a sample hold circuit configured to hold an offset signal of the amplifying unit AP and includes a third transfer transistor M14 and a third holding capacitor CN. More specifically, the state (conductive state or non-conductive state) of the third transfer transistor M14 is switched by using a control signal TS3 so that sampling can be performed in which an offset signal of the amplifying unit AP is transferred to and is held in the capacitor CN. The third output unit OP3 includes a third signal amplification transistor M16 and a third output switch SW15. The third signal amplification transistor M16 is a transistor configured to output a signal acquired by amplifying voltage held in the third holding capacitor CN. The third output switch SW15 is a switch configured to transfer a signal output from the third signal amplification transistor M16. More specifically, a control signal VSR input to the third output switch SW15 brings the third output switch SW15 into a conductive state so that a constant current source (not illustrated) and the third signal amplification transistor M16 in the subsequent stage can form a source follower circuit. Thus, through the third output unit OP3, the pixel P can output a third output signal N based on the offset signal.

Through the first to third output units OP1 to OP3, the first to third signals can be read out nondestructively from the pixel P a plurality of number of times. A plurality of pixels P as described above is arranged in a matrix in the flat panel sensor 105.

Next, with reference to FIG. 3, example operations of the plurality of pixels in the imaging apparatus will be described. Here, signals EN, TS1, TS2, PRES, PCL, TN, and WIDE are collectively supplied to the plurality of pixels P from the imaging control unit 109. Thus, reset driving RD and sampling driving SD, which will be described below, are performed collectively on the plurality of pixels P.

A start setting is defined at a time t1, and driving is started from a time t2. Reset driving RD starting from the time t2 will be described below. The reset driving RD is driving for performing a reset operation and a clamp operation. First, at the time t2, the signal EN is changed to have a high level so that the first amplification transistor M4 and the second amplification transistor M7 are enabled. Next, at a time t3, the signal WIDE and signal PRES are changed to have a high level so that the transistor M1 can be turned on and the photodiode PD is thus electrically connected to a reference voltage VRES. Next, at a time t4, the signal PCL is changed to have a high level so that the transistor M5 is turned on, and a reference voltage VCL is thus connected to the second amplification transistor M7 side of the clamp capacitor Ccl. The signals TS1, TS2, and TN are changed to have a high level simultaneously so that the first transfer transistor M8, the second transfer transistor M11, and the third transfer transistor M14 are turned on. At a time t5, the signal FREES and the signal WIDE are changed to have a low level so that the resetting completes, and a reset voltage is set in the first amplification transistor M4 side of the clamp capacitor Ccl. Because of the ON state of the transistor M1, the added capacitor $C_{FD}'$ also has the transistor M1 side held at the reset voltage, which prevents occurrence of indeterminate voltage. At a time t6, the transistor M5 is turned off, and charges depending on a difference voltage between the reference voltage VCL and the reference voltage VRES are accumulated in the clamp capacitor Ccl, and the clamping operation completes. The first transfer transistor M8, the second transfer transistor M11, and the third transfer transistor M14 are turned off, and a reference voltage signal at a time when the reference voltage VCL is set in the first holding capacitor CS1, the second holding capacitor CS2, and the third holding capacitor CN is sample-held. This can reduce an afterimage effect. The reset driving RD completes, and accumulation of the photoelectric converting unit with the photodiode PD and the ED capacitor $C_{FD}$ is started from the time t6. Because of the accumulation state, the imaging control unit 109 enables the exposure permission signal to be transmitted to the image processing device 111 and requests to expose an X-ray. At a time t7, the signal EN is changed to have a low level, and the first amplification transistor M4 and the second amplification transistor M7 are disabled. The reset driving RD is performed collectively on all of the plurality of pixels. The reset driving to be performed subsequently is also controlled collectively on all of the plurality of pixels. On the tiled semiconductor substrates, reset driving performed collectively on all pixels of tiled imaging elements at an identical time point and in an identical period to prevent an image deviation caused by a time deviation of switching between imaging elements and scanning lines during a movie capturing operation. After that, a collective exposure is performed to accumulate charges, and photo-charges generated in the photodiodes PD in the pixel circuits are accumulated in the ED capacitors $C_{FD}$.

Next, sampling driving SD starting from a time t11 will be described. At the time t11, the signal EN is changed to have a high level so that charges accumulated in the ED capacitor $C_{FD}$ are output as voltage from the first amplification transistor M4 operating as a source follower to the second amplification transistor M7 through the clamp capacitor Ccl. Next, at a time t12, a signal TS1 is changed to have a high level, and the first transfer transistor M8 is turned on. Thus, an optical signal depending on the charges accumulated in the FD capacitor $C_{FD}$ is correctively transferred to the first holding capacitor CS1 through the second amplification transistor M7. The optical signal at that time is a signal acquired in a high sensitivity mode because it changes the signal WIDE to have a low level. Because the sample holding operation has started, the imaging control unit 109 at a time t13 disables the exposure permission signal to the image processing device 111, which inhibits X-ray exposure. At a time t14, the signal TS1 is changed to have a low level, and the first transfer transistor M8 is turned off. Thus, a photo-charge signal in the high sensitivity mode is sample-held in the first holding capacitor CS1. Next, at a time t15, the signal WIDE is changed to have a high level, and the transistor M1 is turned on. Because the transistor M1 is turned on, the floating diffusion portion can have an increased capacitance so that the sensitivity of the pixel changes from the high sensitivity mode to a low sensitivity mode. Thus, because the capacitance of the floating diffusion portion increases by an amount equivalent to the added capacitor $C_{FD}'$, charge information remaining in the PD can also be read out. Next, at a time t16, a signal TS2 is changed to have a high level, and the second transfer transistor M11 is turned on. Thus, an optical signal in the low sensitivity mode is collectively transferred to the second holding capacitor CS2 through the second amplification transistor M7. At a time t17, the signal TS2 is changed to have a low level, and the second transfer transistor M11 is turned off. Thus, a photo-charge signal in the low sensitivity mode is sample-held in the second holding capacitor CS2. Next, at a time t18, the signal PRES is changed to have a high level, and first reset transistor M2 is turned on. Then, the ED capacitor $C_{FD}$ and the added capacitor $C_{FD}'$ are reset to the reference voltage VRES. Next, at a time t19, the signal PCL is changed to have a high level. Charges having reset noise superimposed on a difference voltage between a voltage VCL and a voltage VRES are accumulated in the clamp capacitor Ccl. At a time t20, the signal PRES is changed to have a low level, and the reset operation completes. The signal WIDE is also changed to have a low level, and the added capacitor $C_{FD}'$ has a fixed potential. At a time t21, a signal TN is changed to have a high level, and the third transfer transistor M14 is turned on. Thus, an offset signal at the time when the reference voltage VCL is set is transferred to the third holding capacitor CN. Next, at a time t22, the signal TN is changed to have a low level, and the third transfer transistor M14 is turned off. Thus, the offset signal is sample-held in the third holding capacitor CN. At a time t23, the signal PCL is changed to have a low level. At a time t24, the signal EN is changed to have a low level. Thus, the sampling driving SD completes. The sampling driving SD is collectively performed on all of the plurality of pixels. The subsequent sampling driving is also controlled at this time point. After the sampling driving SD, the reset driving RD is performed again at a time t31, and the accumulation in the photodiode PD in the next frame is then started.

Figure 2:
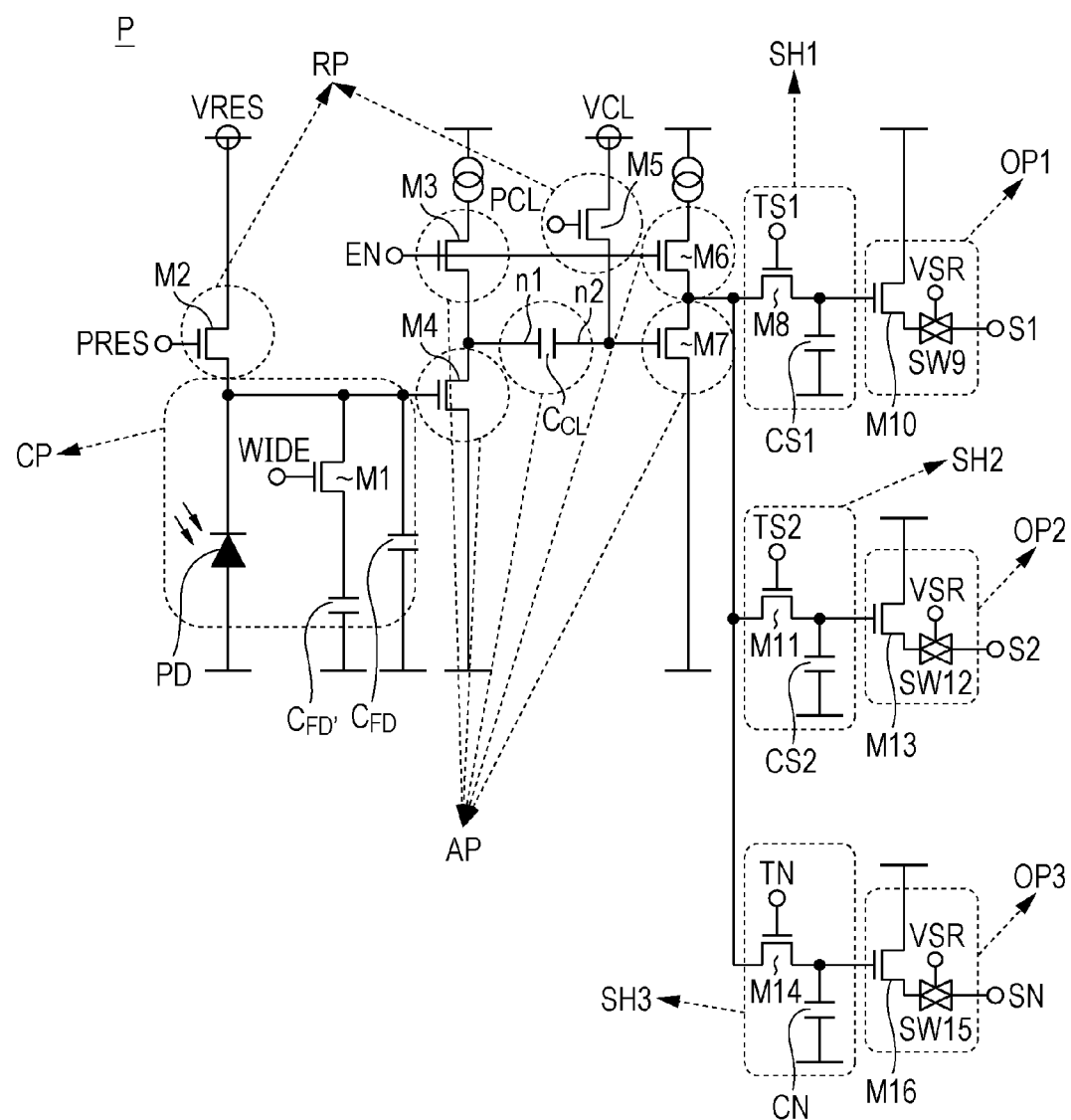
FIG. 2 is a schematic circuit diagram illustrating an example of a configuration of one pixel.
Figure 3:
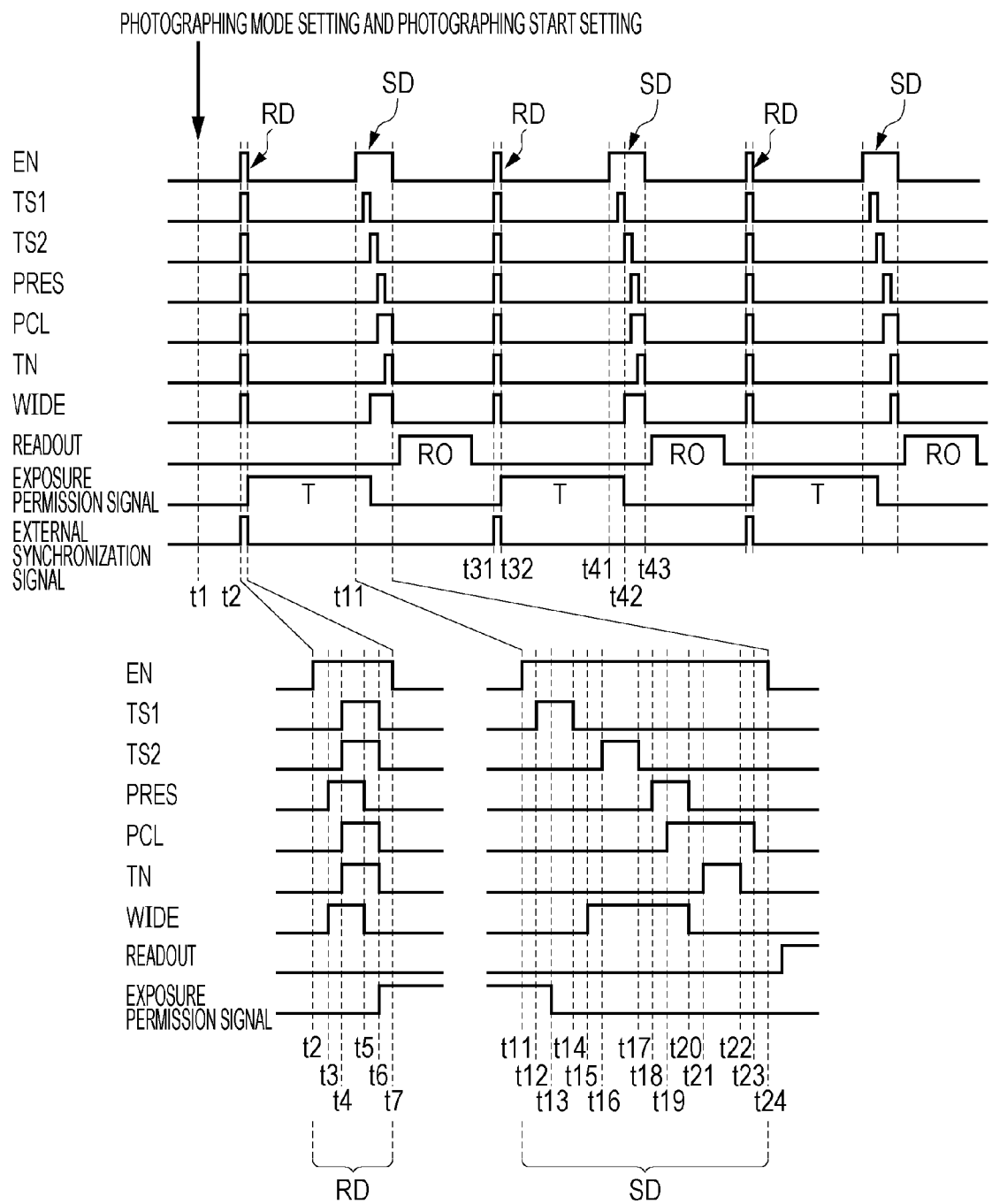
FIG. 3 is a timing chart illustrating example operations of an imaging apparatus.

It should be noted that the accumulation in the photodiode PD in the pixel in FIG. 2 is started at the times t6 and t23 illustrated in FIG. 3. The accumulation ends at the time t14. Signals can be read out from the sensors in a period from the time t17 to the time t31. After the sampling driving SD completes, readout processing RD is performed on the pixels. The readout processing may be performed immediately after the sample holding operation so that a delay up to the image display can be as short as possible.

Figure 4:
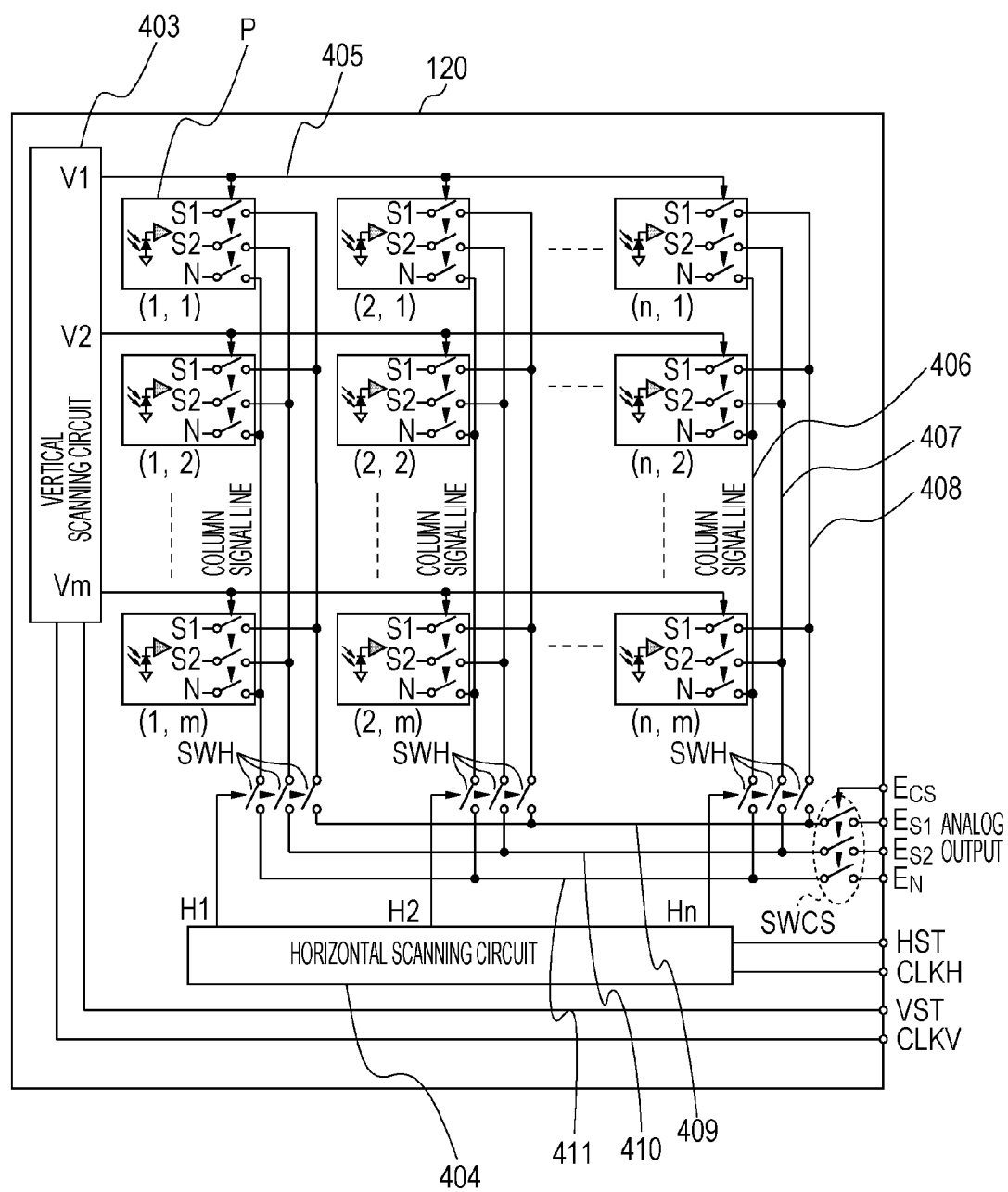
FIG. 4 is a schematic circuit diagram illustrating an example internal structure of a semiconductor substrate according to the first embodiment.

Next, an example of an internal structure of each of the semiconductor substrates 120 will be described with reference to FIG. 4. The semiconductor substrate 120 includes a plurality of pixels P, a vertical scanning circuit 403 configured to drive the pixels P, and a horizontal scanning circuit 404 configured to read signals from the pixels P. The vertical scanning circuit 403 and the horizontal scanning circuit 404 may include shift registers, for example, and operate on the basis of a control signal from the control unit 109. The vertical scanning circuit 403 is configured to input a control signal VSR to the pixels P through a control line 405 and drives the pixels P row by row on the basis of the control signal VSR. In other words, the vertical scanning circuit 403 functions as a row-selection circuit and selects the pixels P row by row to read signals therefrom. The horizontal scanning circuit 404 functions as a column-selection circuit and selects a pixels P column by column on the basis of a control signal HSR and causes the pixels P to output signals sequentially (horizontal transfer). The semiconductor substrate 120 further has a terminal $E_{S1}$ configured to read out a first signal held in the capacitor CS1 in each of the pixels P, a terminal $E_{S2}$ configured to read out a second signal held in the capacitor CS2, and a terminal $E_N$ configured to read out voltage held in the capacitor CN. Each of the semiconductor substrates 120 further has a select terminal $E_{CS}$. In response to an activated signal received by the terminal $E_{CS}$, signals can be read from the pixels P in the semiconductor substrate 120 through the terminals $E_{S1}$, $E_{S2}$ and $E_N$.

More specifically, each of the pixels P has terminals S1, S2 and N connected to column signal lines 406 to 408 corresponding to the terminals, respectively. The column signal lines 406 to 408 are connected to analog output lines 409 to 411 through switches SWH which are brought into a conductive state in response to a control signal from the horizontal scanning circuit 404. The signals in the analog output line 409 to 411 are output from the terminals $E_{S1}$, $E_{S2}$ and $E_N$ through switches SWCS which are brought into a conductive state in response to a signal received by the terminal $E_{CS}$.

Each of the semiconductor substrates 120 further has terminals HST, CLKH, VST and CLKV configured to receive control signals for controlling the vertical scanning circuit 403 and the horizontal scanning circuit 404. The terminal HST is configured to receive a start pulse input to the horizontal scanning circuit 404. The terminal CLKH is configured to receive a clock signal input to the horizontal scanning circuit 404. The terminal VST is configured to receive a start pulse input to the vertical scanning circuit 403. The terminal CLKV is configured to receive a clock signal input to the vertical scanning circuit 403. These control signals are input from the control unit 109, which will be described below. The horizontal scanning circuit 404 is configured to generate and output a control signal HSR on the basis of a start pulse and a clock signal input thereto. The vertical scanning circuit 403 is configured to generate and output a control signal VSR on the basis of a start pulse and a clock signal input thereto. Thus, the first signal or the first output signal, the second. output signal, and the third output signal are sequentially read from the pixels according to an X-Y address method. In other words, in the semiconductor substrate 120, the pixels P are controlled row by row, and signals held in the holding units are output column by column (or horizontally transferred) for signal reading. Here, the start pulse input to the horizontal scanning circuit 404 corresponds to a column-selection. start signal, and the start pulse input to the vertical scanning circuit 403 corresponds to a row-selection start signal. The control unit according to the present disclosure includes the imaging control unit 109, the vertical scanning circuit 403 being a row-selection circuit and the horizontal scanning circuit 404 being a column-selection circuit in this configuration.

Figure 5:
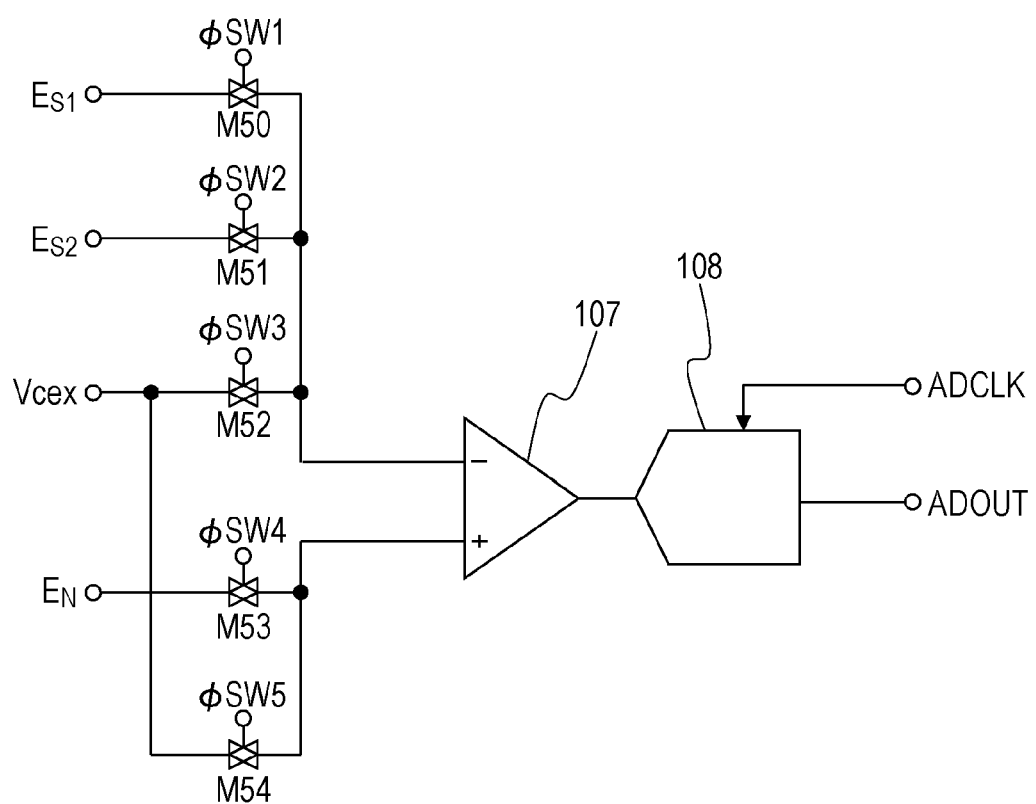
FIG. 5 is a schematic circuit diagram illustrating an example circuit substrate according to the first embodiment.

Next, with reference to FIG. 5, an example of the circuit substrate including an output amplifier will be described. The circuit substrate includes a differential amplifier 107 being an output amplifier and an A/D converter 108. A first switch M50 is arranged between a terminal Si electrically connected to the terminal Es of the semiconductor substrate 120 and an inverting input terminal of the differential amplifier 107. A second switch M51 is arranged between a terminal S2 electrically connected to the terminal $E_{S2}$ of the semiconductor substrate 120 and the inverting input terminal of the differential amplifier 107. A third switch M52 is arranged between a terminal Vcex electrically connected to the voltage supply unit 121 and the inverting input terminal of the differential amplifier 107. On the other hand, a fourth switch M53 is arranged between a terminal N electrically connected to the terminal $E_N$ of the semiconductor substrate 120 and the non-inverting input terminal of the differential amplifier 107. A fifth switch M54 is arranged between the terminal Vcex electrically connected to the voltage supply unit 121 and the non-inverting input terminal of the differential amplifier 107. The A/D converter 108 is electrically connected to the output of the differential amplifier 107 and is configured to convert an analog signal to a digital signal in response to a control signal ADCLK. The conduction/non-conduction of the first to fifth switches M50 to M54 are controlled in accordance with control signals φSW1 to φSW5, respectively, from the imaging control unit 109.

Figure 6:
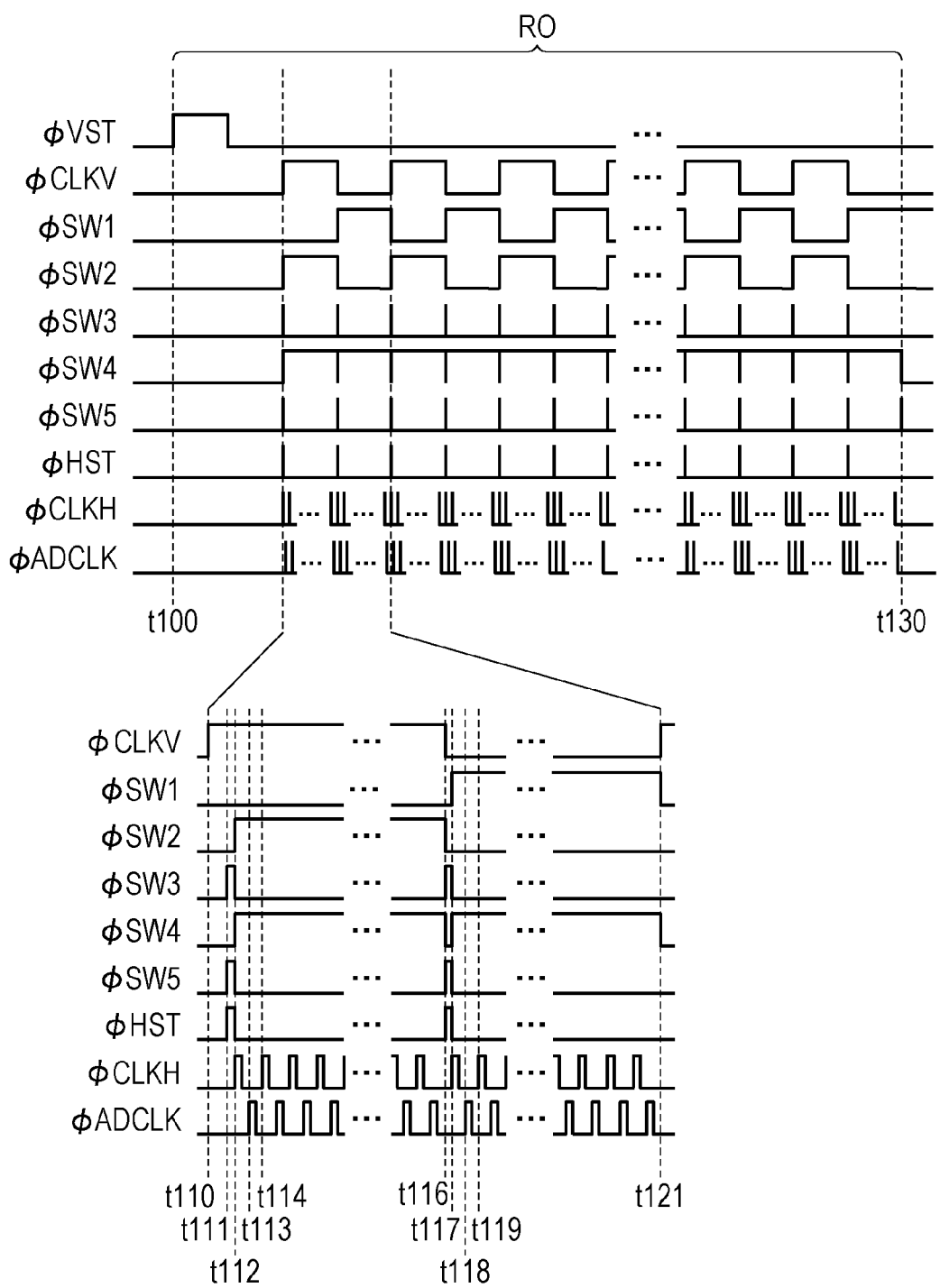
FIG. 6 is a timing chart illustrating control in an imaging apparatus according to the first embodiment.

Next, with reference to FIG. 6, distinctive control of the present disclosure will be described. Control signals φVST to φADCLK, which will be described below, are supplied from the imaging control unit 109. Here, while readout processing is being performed, a chip select terminal CS has a high level at all times. First, at a time t100, the signal φVST is changed to have a high level, and the vertical scanning circuit. 403 is set to start from the row-selection line V1. The signal φVST corresponds to a row-selection start signal. At a time t110, the signal φCLKV is changed to have a high level, and the row-selection line V1 is selected. Next, at a time t111, the signal φHST is changed to have a high level, and the horizontal scanning circuit 404 is set to start from a column-selection line H1. The signal φHST corresponds to a column-selection start signal. At the same time, the signals φSW3 and φSW5 are changed to have a high level, and a reference voltage is input from the voltage supply unit 121 to the inverting input and the non-inversion input of the differential amplifier 107 through the terminal Vcex.

Because the terminal Vcex has sufficiently lower impedance than those of the analog output lines 409 to 411, the inverting input terminal and the non-inverting input terminal of the differential amplifier 107 are stable with the reference voltage. This resets the differential amplifier 107 that is an output amplifier. Next, at a time t112, the signals φHST, φSW3, and φSW5 are changed to have a low level, and the signals φSW2 and φSW4 are changed to have a high level. This connects the terminal S2, that is, the output in a low sensitivity mode to the inverting input terminal of the differential amplifier 107 and electrically connects the terminal N to receive an offset signal to the non-inverting input terminal of the differential amplifier 107. At the same time, the signal φCLKH is changed to have a high level, and the column-selection line Hi is selected. Thus, the second output signal S2 and offset signal N output from the pixel (1,1) are input to the differential amplifier 107. Next, at a time t113, the signal φADCLK is changed to have a high level, and A/D conversion is performed in the A/D converter 108. Thus, the A/D converted digital image data ADOUT in a high sensitivity mode in the pixel (1,1) is transmitted to the imaging control unit 109. Next, at a time t114, the signal φCLKH is changed to have a high level again, and a column-selection line H2 is selected. Thus, digital image data ADOUT in the high sensitivity mode is transmitted from a pixel (2,1) to the imaging control unit 109. This processing is repeated on n columns so that signals are read out from pixels of one row in the low sensitivity mode. Next, at a time t116, the signals φSW2 and φSW4 are changed to have a low level. At the same time, the signals φSW3 and φSW5 are changed to have a high level again, a reference voltage is input from the voltage supply unit 121 to the inverting input terminal and the non-inverting input terminal of the differential amplifier 107 through the terminal Vcex. Thus, the differential amplifier 107 being an output amplifier is reset. At the same time, the signal φHST is changed to have a high level, and the horizontal scanning circuit 404 is set to start from the column-selection line H1 again. Then, the selection of Hn is released. In other words, in a period from a time t110 to a time t121 in which a plurality of pixels of one row is selected, the differential amplifier 107 is reset, in accordance with the signal φHST that is an instruction to start the second. and subsequent nondestructive readout processing of multiple nondestructive readout processing to be performed on the pixels of the row. In other words, while nondestructive readout processing is being performed on pixels of one row, the differential amplifier 107 is reset in response to the signal φHST. Next, at a time t117, the signals φHST, φSW3, and φSW5 are changed to have a low level, and the signals φSW1 and φSW4 are changed to have a high level. The output in the high sensitivity mode is connected to the inverting input terminal of the differential amplifier 107, and the offset signal N is connected to the non-inverting input terminal of the differential amplifier 107. At the same time, the signal φCLKH is changed to have a high level, and the column-selection line H1 is selected. The first output signal S1 and offset signal N output from the pixel (1,1). are input to the differential amplifier 107. Next, at a time t119, the signal φADCLK is changed to have a high level, and A/D conversion is performed in the A/D converter 108. The AID converted digital image data ADOUT in the low sensitivity mode in the pixel (1,1) is transmitted to the imaging control unit 109. Next, at a time t120, the signal φCLKH is changed to have a high level, and the column-selection line H2 is selected. Digital image data ADOUT in the high sensitivity mode in the pixel (2,1) is transmitted to the imaging control unit 109, in the same manner as the processing performed on the pixel (1,1). At a time t121 after the processing is performed n times on one row like those in the low sensitivity mode, the signal φCLKV is changed to have a high level again, and the row-selection line V2 is selected. The row-selection line V2 is driven in the same manner as the driving of the row-selection line V1, and the processing is repeated m times. Until a time t130, digital image data in the low sensitivity mode and the high sensitivity mode in all of the pixels are transmitted to the imaging control unit 109. The pixel data in the low sensitivity mode and the high sensitivity mode transmitted to the imaging control unit 109 are transmitted to the image processing device 101 through the image data interface 111, and image processing for dynamic range expansion is performed.

Figure 7:
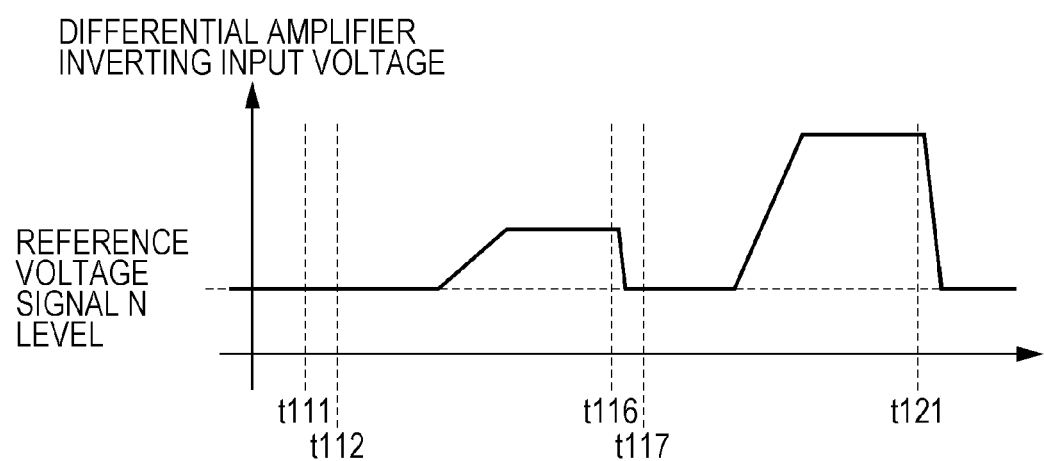
FIG. 7 is a characteristic diagram illustrating changes in voltage of an inverting input terminal of a differential

The present disclosure is characterized in that the differential amplifier 107 being an output amplifier is reset in response to an instruction to start the second and subsequent nondestructive readout processing of multiple nondestructive readout processing to be performed on the pixels of the row. More specifically, as illustrated in FIG. 6, the imaging control unit 109, the vertical scanning circuit 403, and the horizontal scanning circuit 404, which are control units, perform control as will be described below in a period in which the vertical scanning circuit 403 being the row-selection circuit selects a plurality of pixels of one row. It is assumed here that a is a natural number equal to or higher than one. The differential amplifier 107 is reset during a period from a time when the horizontal scanning circuit 404 being the column-selection circuit performs an $a^{th}$ selection of the pixel (n,1) in the last column to a time when the horizontal scanning circuit 404 performs the $(a+1)^{th}$ selection of the pixel (1, 1) in the first column. In other words, the differential amplifier 107 is reset during a period from when the last pixel in a row (the pixel in the last, or right-most, column) is selected for the $a^{th}$ time (e.g. $2^{nd}$, $3^{rd}$, ... $a^{th}$ time) to when the first pixel in the same row (the pixel in the first, or left-most, column) is selected for the $(a+1)^{th}$ time (e.g. $3^{rd}$, $4^{th}$, ... $(a+1)^{th}$ time). In this case, the differential amplifier 107 may be reset in response to the $(a+1)^{th}$ column-selection start signal φHST at the time t116 in response to the row-selection start signal φVST. Under this control, an image artifact due to an insufficient settling time of the output amplifier can be inhibited even after nondestructive readout processing is performed a plurality of number of times on pixels of one row. For example, when the H1 side of the semiconductor substrate 120 is shut down and the Hn side is not shielded at all, an artifact may occur in a resulting image. When pixel data with a lower light intensity is read out after pixel data with a higher light intensity is read, the inverting input terminal of the differential amplifier 107 outputs voltage depending on irradiated radiation at the time t116 in FIG. 6, as illustrated in FIG. 7. However, a reference voltage to be supplied to the terminal Vcex is supplied from the voltage supply unit 121 to the inverting input terminal and non-inverting input terminal of the differential amplifier 107. The reference voltage may be substantially equal to the level without irradiation of radiation and may be stabilized to the level to prevent occurrence of a rapid change in the output of the differential amplifier 107 at the time t118. Thus, an image output with a reduced image artifact can be acquired even when radiation is not irradiated to the pixels on the H1 side.

When the reference voltage is not equal to the level without irradiation of radiation, the time period in which the column-selection line H1 is being selected may be longer than a time period in which another column-selection line is being selected. In other words, the time period after the times t111 and t117 when the column-selection. line Hi is selected to the times t113 and t118 when the signal φADCLK is changed to a high level may be defined in consideration of the settling time of the differential amplifier 107. The signal φCLKH may be delayed after the time t114 and after the time t119.

According to this embodiment, a signal in the low sensitivity mode may be output first from a pixel so that the time period from the time t116 to the time t117 can be shorter than the time period in a case where a signal in the high sensitivity mode is output first from the pixel. More pixel data in the high sensitivity mode can reach a saturation level of the differential amplifier 107 than the pixel data in the low sensitivity mode. Thus, pixel data in the low sensitivity mode may be read first to reduce the potential difference between input terminals of the differential amplifier 107 at the time t116. This can reduce the drive time.

According to this embodiment, the terminal Vcex has a sufficiently lower impedance than those of the analog output lines 409 to 411. The terminal Vcex is also applicable even when it does not have a sufficiently low impedance. In this case, when the signal φHST is changed to have a low level at the times t111 and t117, the signals φSW2, φSW3, φSW4, and φSW5 may be controlled at the same time. Instead of the control at the same time, the control over the signals φSW2, φSW3, φSW4, and φSW5 may be started in accordance with the time period that the terminal Vcex can drive the analog output lines 409 to 411. The signal φCLKH may be started simultaneously with the control over the signals φSW2, φSW3, φSW4, and φSW5.

Having described that, according to this embodiment, the method for reading out pixel data in a low sensitivity mode and a high sensitivity mode, the present disclosure is applicable to driving for reading out signals nondestructively from one row a plurality of number of times without changing the sensitivity. This may be implemented easily by, for example, changing the signal φSW2 instead of the signal φSW1 to a high level at the time t118 in FIG. 6 easily.

Second Embodiment

Next, a second embodiment will be described with reference to FIGS. 8 to 13. Like numbers refer to like parts in the first and second embodiments, and any repetitive detail description will be omitted. Differences from the first embodiment will mainly be described below.

Figure 8:
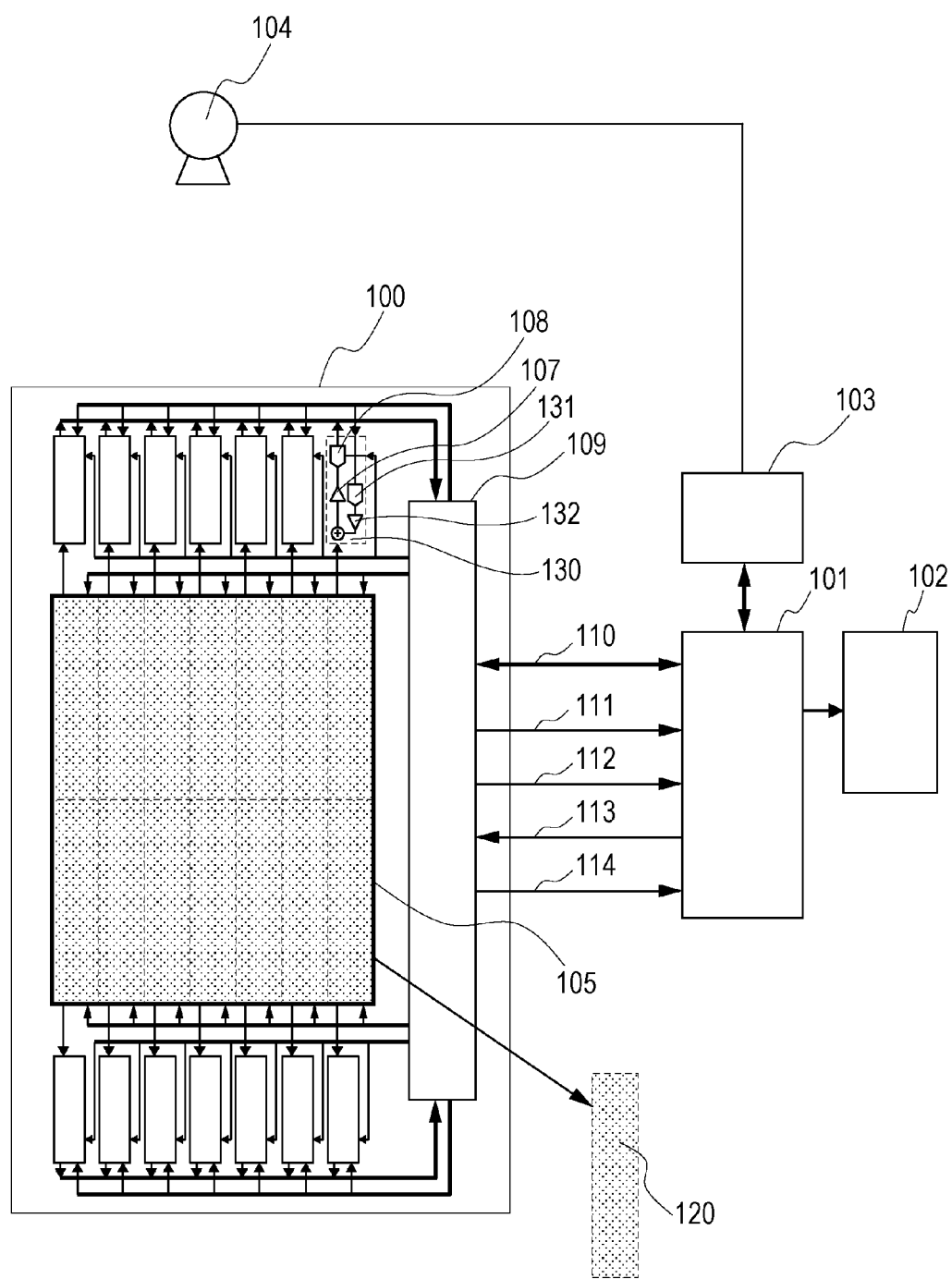
FIG. 8 is a schematic block diagram illustrating a radiographic imaging system according to a second embodiment.
Figure 9:
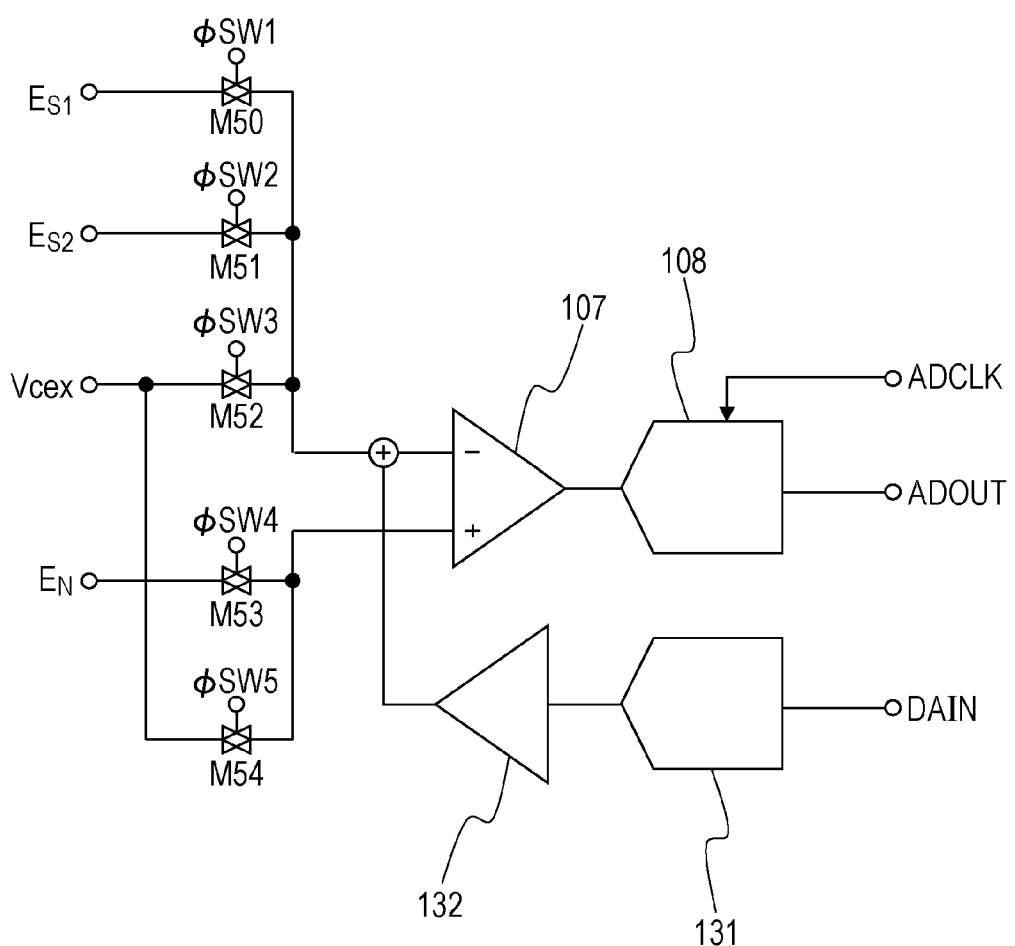
FIG. 9 is a schematic circuit diagram illustrating an example circuit substrate according to the second embodiment.

As illustrated in FIG. 8, the imaging apparatus according to this embodiment further includes a correction unit configured to supply correction voltage to an input of the differential amplifier 107. The correction voltage is usable for correcting offset components in the differential amplifier 107 and the A/D converter 108 based on a digital signal from the A/D converter 108. More specifically, the correction unit includes a D/A converter 131 and an amplifier 132 configured to supply correction voltage based on a correction signal DAIN to an input to the differential amplifier 107. As illustrated in FIG. 9, the D/A converter 131 and the amplifier 132 input the correction voltage to an inverting input terminal of the differential amplifier 107.

Figure 10:
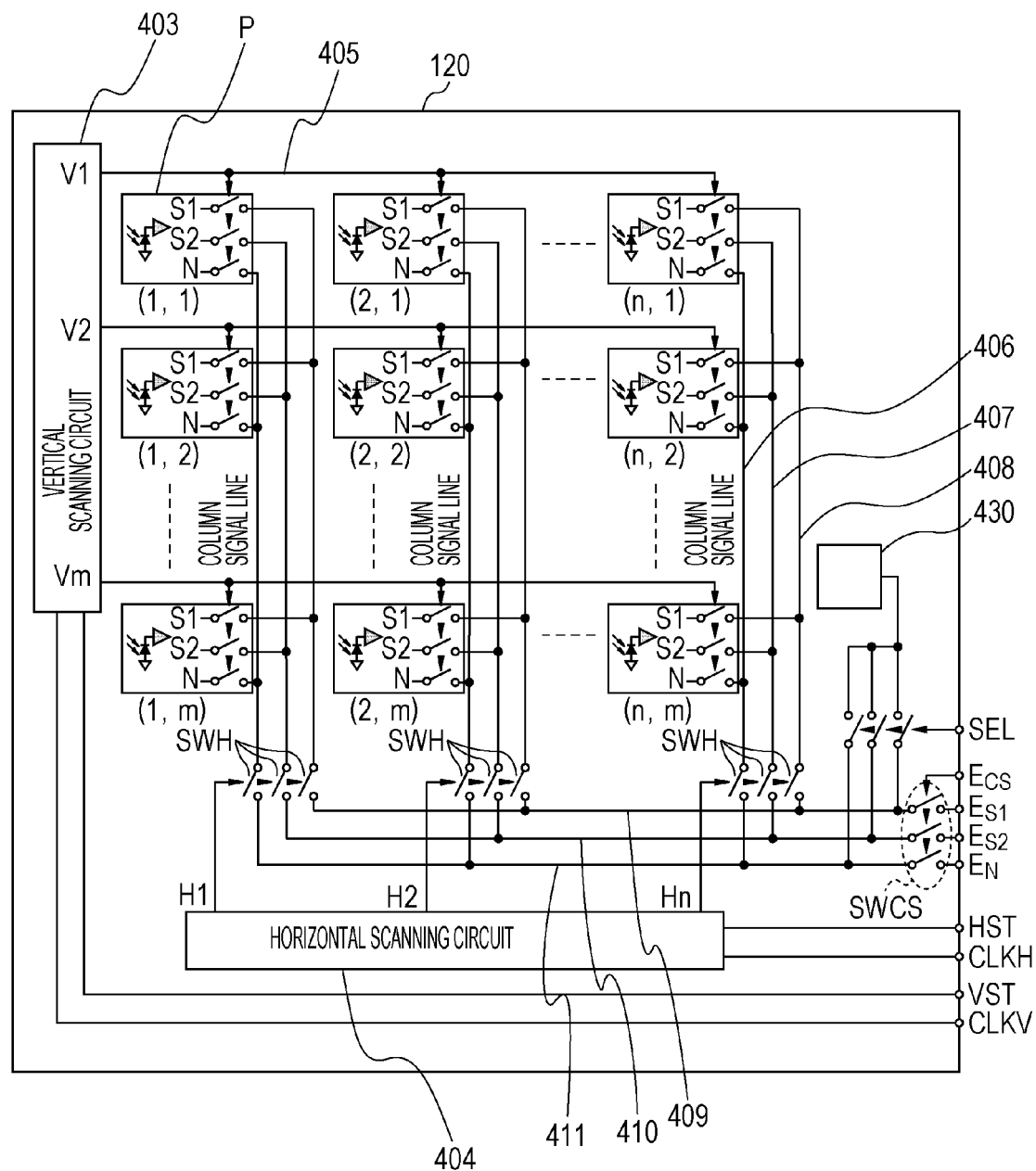
FIG. 10 is a schematic circuit diagram. illustrating an example internal structure of a semiconductor substrate according to the second embodiment.
Figure 11:
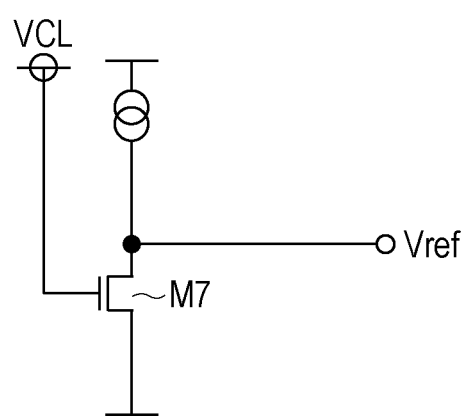
FIG. 11 is a schematic circuit diagram illustrating a voltage supply unit according to the second embodiment.

As illustrated in FIG. 10, the imaging apparatus according to this embodiment further includes a reference voltage generating circuit 430 within each of the semiconductor substrates 120, and analog output lines 409 to 411 and the reference voltage generating circuit 430 are electrically connected through a terminal SEL in accordance with a signal φSEL from the imaging control unit 109. FIG. 11 illustrates an example of the reference voltage generating circuit 430. A clamp voltage VCL is output as a reference voltage Vref, which is equivalent to the reference voltage in FIG. 2, through the transistor M7, which is equivalent to the second amplification transistor M7, of the pixel. Thus, the reference voltage Vref is a signal corresponding to the offset signal N. Thus, signals corresponding to a change of the offset signal N caused by a change in an operating environment of the semiconductor substrate 120 such as the temperature and operation voltage of the semiconductor substrate 120 or external noise can be acquired from the reference voltage Vref.

Figure 12:
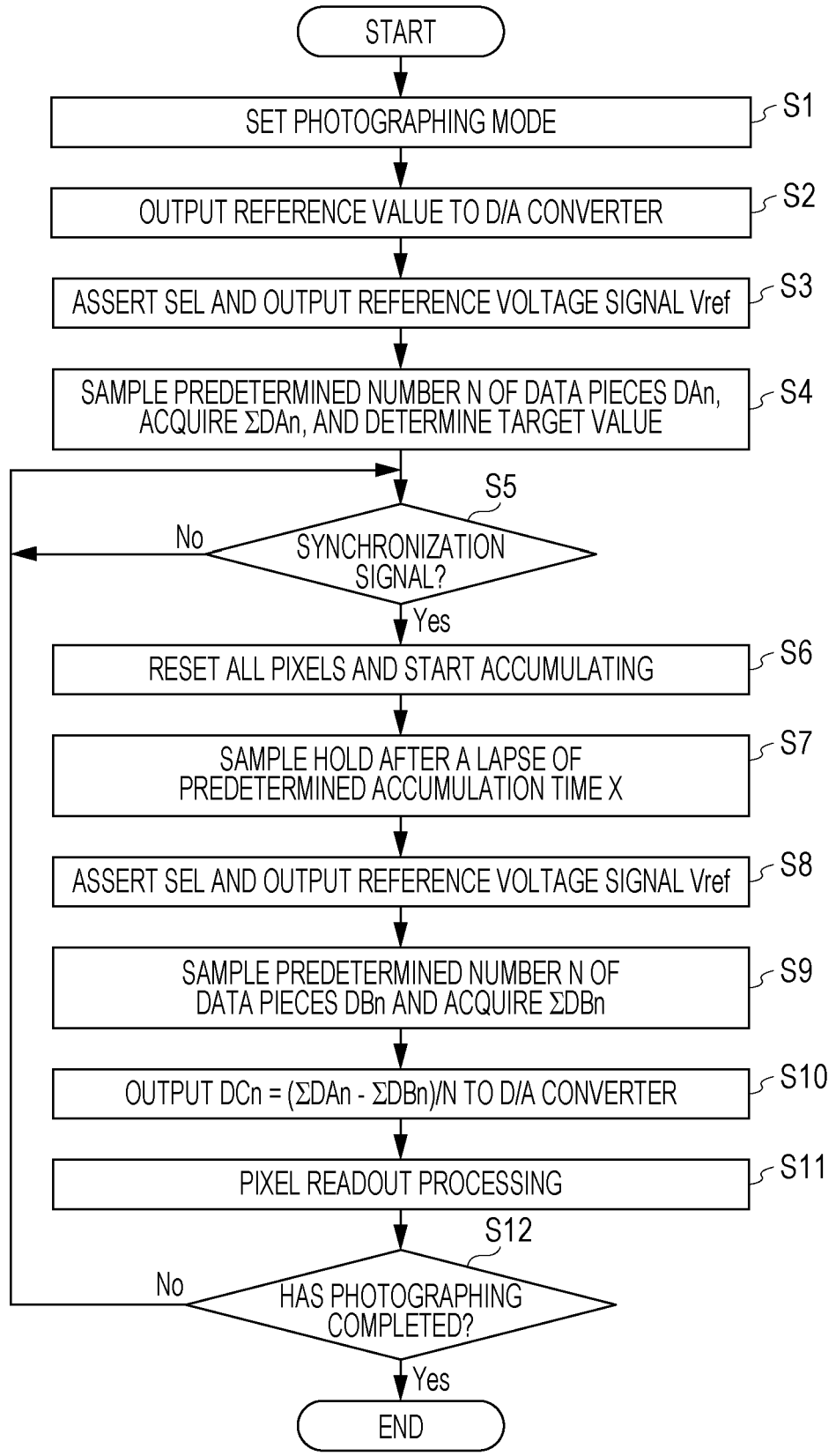
FIG. 12 is a flowchart illustrating a control according to the second embodiment.

Next, a control according to this embodiment will be described with reference to a flowchart in FIG. 12. After a photographing mode is set (S1), a reference value is first output to the D/A converter 131 (S2) to generate a target value(correction voltage) for offset correction. Next, the imaging control unit 109 changes the signal φSEL to a high level to control such that the semiconductor substrate 120 can output the reference voltage Vref (S3). After the semiconductor substrate 120 starts outputting the reference voltage Vref, the imaging control unit 109 samples a predetermined number N of samples of data output from the A/D converter 108 and calculates a sum ΣDAn of the N target value data DAn (S4) for preparation. In S2, because the reference value is set for the D/A converter, an offset due to 1/f noise can be brought closer to 0 by correcting a variation value from DAn. Because the state for acquiring DAn is defined as ±0, the dynamic range of the D/A. converter can be used effectively.

Next, an operation for acquiring data for 1/f noise correction will be described which is to be performed after a synchronizing signal is detected (S5) and pixel resetting and accumulation (S6) and sampling (S7) are completed.

The imaging control unit 109 changes the signal φSEL to a high state to cause the semiconductor substrate 120 to output the reference voltage Vref (S8). After the reference voltage Vref is output, the predetermined number N of output data DBn from the A/D converter 108 are sampled, and a sum ΣDBn is acquired (S9). The reference voltage Vref is output so that 1/f noise occurring in the semiconductor substrate 120, the differential amplifier 107, and the A/D converter 108 can be measured as a variation value from a target value.

Here, the imaging control unit 109 calculates DCn= (ΣDAn−ΣDBn)/N as correction data and outputs a result thereof to the D/A converter 131 (S10). The acquired correction value DCn represents a change from the target value. The output correction value which is digital data is converted to an analog signal by the corresponding D/A converter 131 and undergoes a predetermined analog signal process through the amplifier 132. The resulting signal is added to an output signal from the semiconductor substrate 120 by an adding circuit, and the offset is corrected. For example, when 1/f noise occurs and an increased offset is generated, a measurement value ΣDBn increases with respect to a target value ΣDAn. Thus, negative DCn is applied to reduce the offset to be finally superimposed on an output signal from the rectangular semiconductor substrate 120.

In this manner, the 1/f noise occurring in the semiconductor substrate 120, the differential amplifier 107, and the A/D converter 108 can be corrected.

Next, in the pixel readout processing in (S11), the vertical scanning circuit 403 and the horizontal scanning circuit 404 scan a plurality of pixels so that the correction can be performed while voltage sample-held in the pixels are being sequentially output to outside. The operation in (S11) will be described below with reference to FIG. 13.

The processing described above is repeated to read out signals from pixels in the semiconductor substrate 120. In (S12), the imaging control unit 109 judges whether the imaging has completed or not. If so, the imaging operation ends. If not, the processing moves to (S5), and the next imaging operation is continuously performed.

Next, with reference to FIG. 13, differences from the output amplifier resetting according to the first embodiment will be described. First, at a time t200, the signal φVST is changed to have a high level so that the vertical scanning circuit 403 is set to start from the row-selection line V1. At a time t210, the signal φCLKV is changed to have a high level, and the row-selection line V1 is selected. At the same time, the signals SW1, SW4, and SEL are changed to have a high level, voltage acquired by adding a correction value for 1/f noise correction to a reference voltage Vref is input to the inverting input terminal of the differential amplifier 107 while the voltage Vref is input to the non-inverting input terminal of the differential amplifier 107. In a state that the reference voltage Vref is being output, a predetermined number N' of output data DPn in the A/D converter 108 are sampled to acquire a sum ΣDPn'. Here, if the sampling number N of data to be acquired for generating data of a target value before the operation is equal to the sampling number N' of data to be acquired for the offset correction in a readout operation, DRn=(ΣDAn−ΣDPn')/N can be acquired as the correction data. The numbers of data to be sampled in (S4), (S9) and here may not be equal. For example, if the sampling number N=M×N', DRn=(ΣDAn−ΣDPn'×M)/N may be acquired. At a time t211, the signals φSW1, φSW4, and φSEL are changed to have a low level, and the signal φHST is changed to have a high level. Thus, the horizontal scanning circuit 404 is set to start from H1. At the same time, the signals φSW3 and φSW5 are changed to have a high level. Thus, voltage acquired by adding a correction value for 1/f noise correction to a reference voltage supplied to the terminal Vcex is input to the inverting input terminal of the differential amplifier 107, and the reference voltage is input to the non-inverting input terminal of the differential amplifier 107. Here, the calculated correction value DRn is output to the D/A converter 131. Thus, with a lower number of sampled data, the influence of random noise can be suppressed, and 1/f noise that changes during a readout operation can be corrected in real time. After this processing, signals in pixels in a low sensitivity mode of one row are read out in the same manner as FIG. 6. Next, during a period from a time t212 to a time t213, the signals φSW3 and φSW5 are changed to have a high level in the same manner as in FIG. 6. Thus, voltage acquired by adding a correction value for 1/f noise correction to a reference voltage supplied the terminal Vcex is input to the inverting input of the differential amplifier 107, and the reference voltage supplied to the terminal Vcex is input to the non-inverting input terminal. After that, in the same manner as in FIG. 6, signals in the pixels of one row in a high sensitivity mode are read out until a time t214. The signal φCLKV is changed to a high level again, and the row-selection line V1 is selected. At the same time, the signal φSEL is changed to have a high level. In this case, the signals φSW1 and φSW4 still have a high level. Thus, the added voltage is input to the inverting input terminal of the differential amplifier 107, and the voltage Vref is input to the non-inverting input terminal. After this, the same driving as on the row-selection line V1 is performed until a time t215 and is repeated up to the row-selection line Vm. Hence, digital image data in the low sensitivity mode and the high sensitivity mode are transmitted to the imaging control unit 109 by correcting 1/f noise in all pixels in real time until a time t230.

Figure 13:
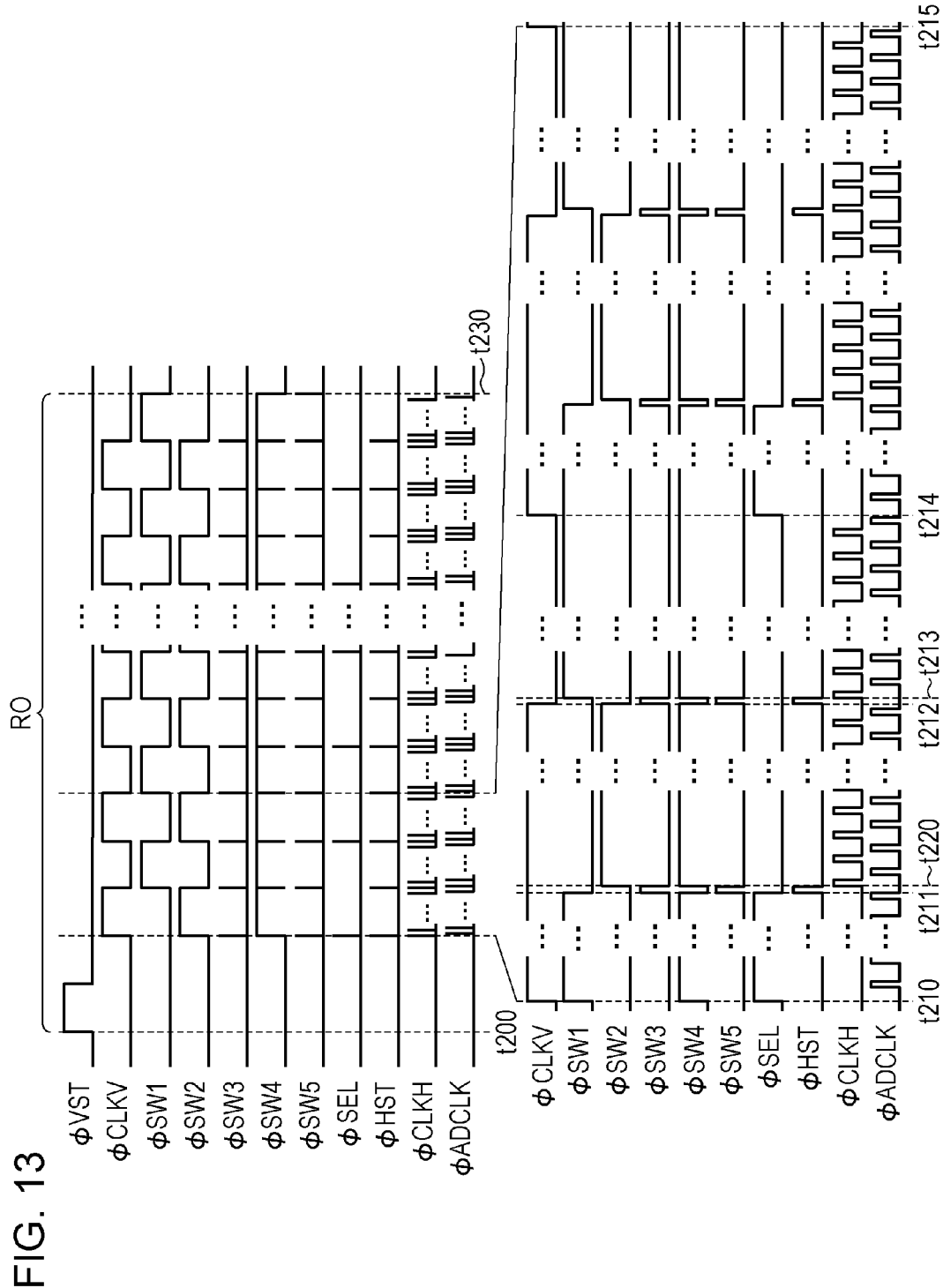
FIG. 13 is a timing chart illustrating a control in an imaging apparatus according to the second embodiment.

In the driving illustrated in FIG. 13, even in a circuit having a reference voltage Vref for acquiring correction data for 1/f noise, the reference voltage to be supplied to the terminal Vcex is input to the differential amplifier 107 once before data of one row are read out. In a case where the reference voltage Vref is used for the signal φSEL, the capacitance in the analog output lines 409 to 411 and the input terminal of the differential amplifier 107 are required to be driven by the reference voltage generating circuit 430. However, because of an insufficiently low impedance of the reference voltage generating circuit 430, the driving of the capacitance generally takes time. Accordingly, even in such a case, the external voltage supply unit 121 can be used to reset both of the inputs of the differential amplifier 107 to a voltage equivalent to the offset signal N in a short period of time.

According to this embodiment, at the time t211, the signal φSEL is changed to have a low level, and the signals φSW3 and φSW5 are changed to have a high level. An embodiment of the present disclosure is not limited thereto. Instead, control may be executed such that the signal φSEL is changed to have a low level at the time t220, and the signals φSW1 or φSW2 and φSW4 are changed to have a high level at the time t211 without changing the signals φSW3 and φSW5 to a high level. From the output of the first row selected with the signal φCLKV, correction data for 1/f noise is acquired, and a signal equivalent to the offset signal N is input to the differential amplifier 107. Therefore, the reference voltage supplied to the terminal Vcex may not have to be used.

Third Embodiment

Next, a third embodiment will be described with reference to FIGS. 14 to 16. Like numbers refer to like parts in the first, second and third embodiments, and any repetitive detail descriptions will be omitted. Differences from the second embodiment, will mainly be described below.

Figure 14:
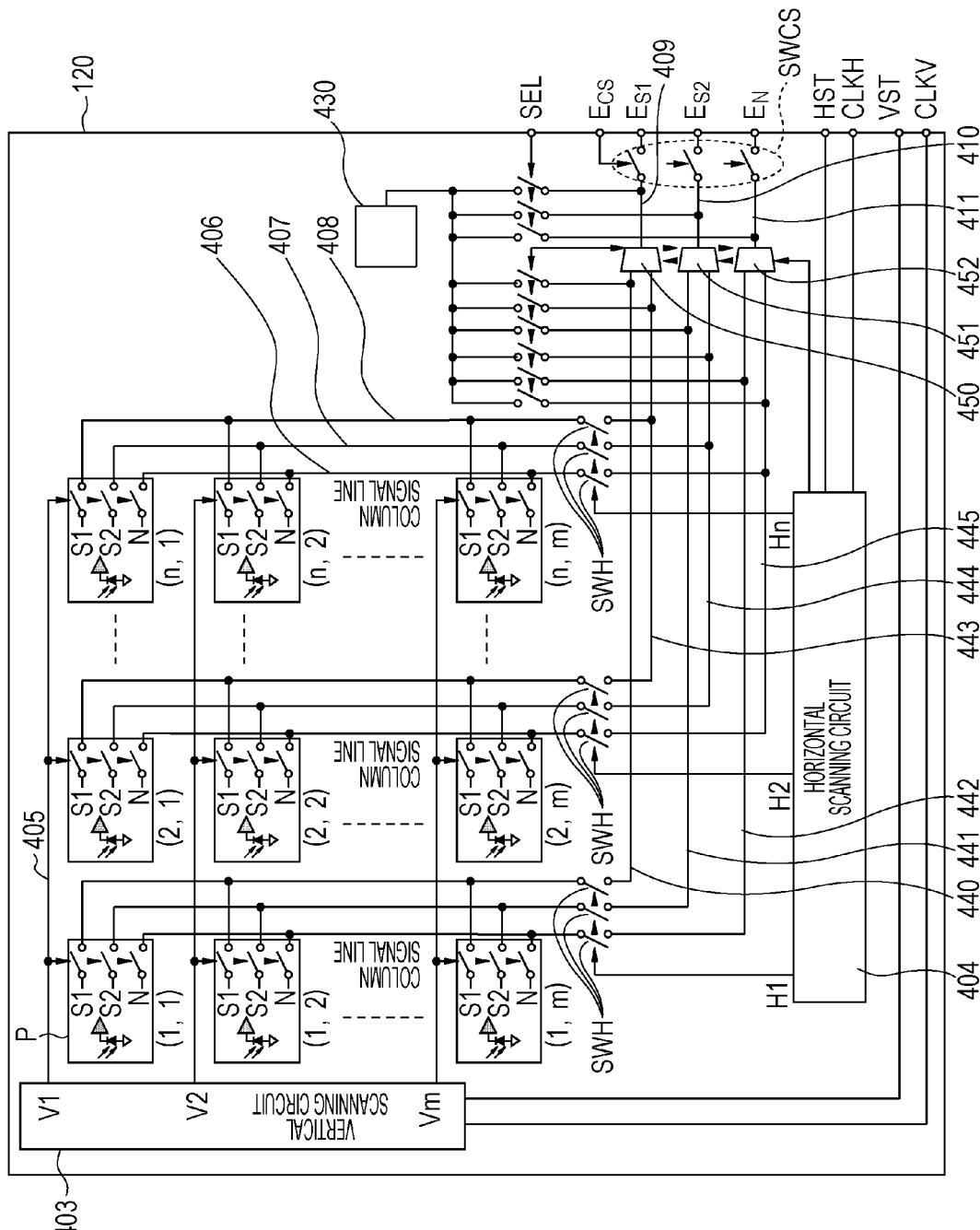
FIG. 14 is a schematic circuit diagram illustrating an example internal structure of a semiconductor substrate according to a third embodiment.

As illustrated in FIG. 14, the third embodiment is different from the second embodiment illustrated in FIG. 10 in that output enabled multiplexers 450 to 452, analog output lines 440 to 442 for odd-numbered columns, and analog output lines 443 to 445 for even-numbered columns are further provided. Each of the analog output lines for odd-numbered columns and even-numbered columns provided in the previous stage of the analog output line 409 to 411 can have a reduced capacitance component. A reference voltage Vref and the analog output lines (409, 410, 411, 440, 441, 442, 443, 444, 445) may be connected through impedance conversion a source follower, for example. Thus, the analog output lines can be set to the internal reference voltage Vref in a short period of time. Outputs of the multiplexers 450, 451, and 452 are controlled to be enabled in response to a low level of the SEL signal and to be disabled in response to a high level of the SEL signal.

Figure 15:
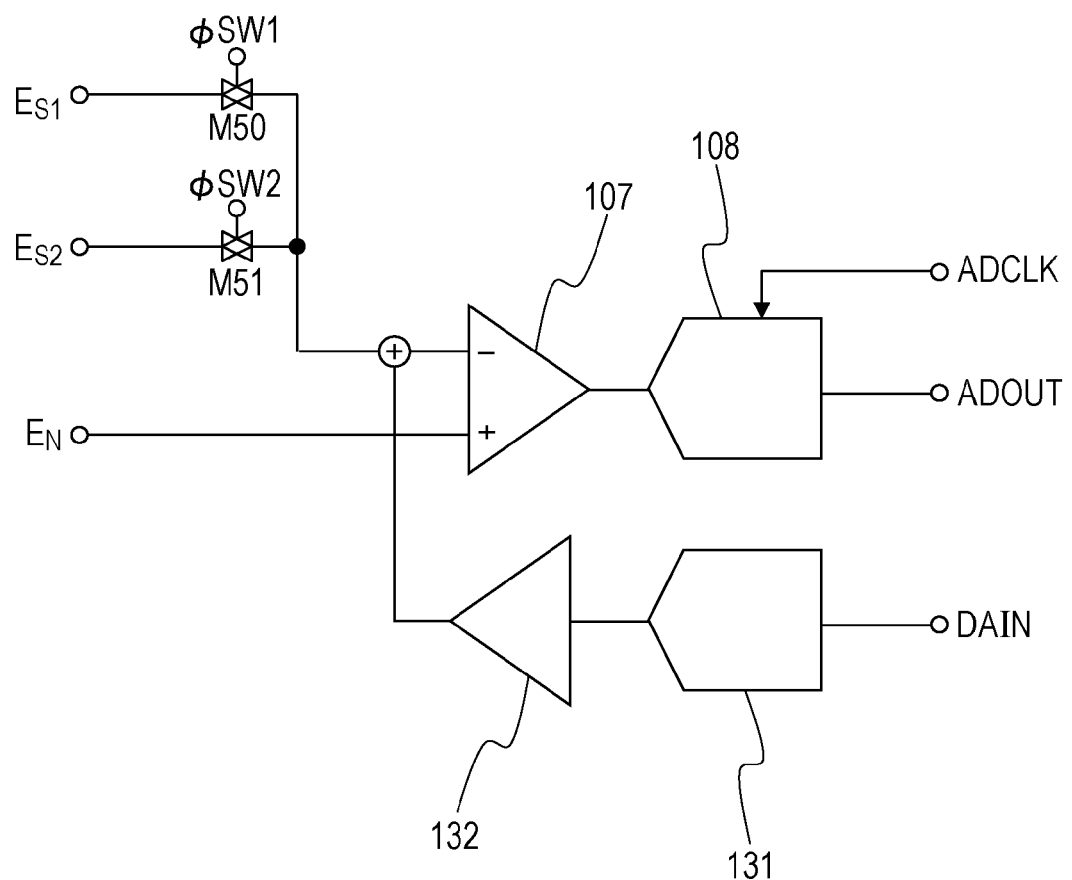
FIG. 15 is a schematic circuit diagram illustrating an example circuit substrate according to the third embodiment.

As illustrated in FIG. 15, the third embodiment is different from the second embodiment illustrated in FIG. 9 in that the terminal Vcex, the third switch 1152, the fourth switch M53, and the fifth switch M54 are not provided.

Next, with reference to FIG. 16, differences from the second embodiment illustrated in FIG. 13 will be described. In the driving illustrated in FIG. 16, a reference voltage, that is equivalent to an offset signal N, for acquiring correction data for 1/f noise is input to the differential amplifier 107 before signals are read out from pixels of a row. In other words, the reference voltage generating circuit 430 only functions as a voltage supply unit. Thus, the voltage supply unit 121 may not be provided outside the semiconductor substrate 120, and no switch is necessary for selecting a power supply and an analog signal output, which can simplify the circuit.

According to this embodiment, analog output lines may be divided into two of those for an odd-numbered column and those for an even-numbered column. The number of divisions may be increased so that the parasitic capacitances of the analog output lines can be reduced and voltage therein can be stabilized in a shorter period of time.

According to this embodiment, the reference voltage Vref undergoes impedance conversion in a source follower so that the driving ability for analog signal output lines can be implemented. However, an embodiment of the present disclosure is not limited thereto. For example, excluding the time period for acquiring correction data for 1/f noise, a power line within the semiconductor substrate 120 may be used to cause the analog output lines to have voltage equivalent to the offset signal N.

According to this embodiment, the signal φSEL is applied to control the output reference voltage Vref. However, a signal within the vertical scanning circuit 403 or the horizontal scanning circuit 104 in the semiconductor substrate 120 may be applied to execute timing control equivalent to that of the signal φSEL.

Figure 16:
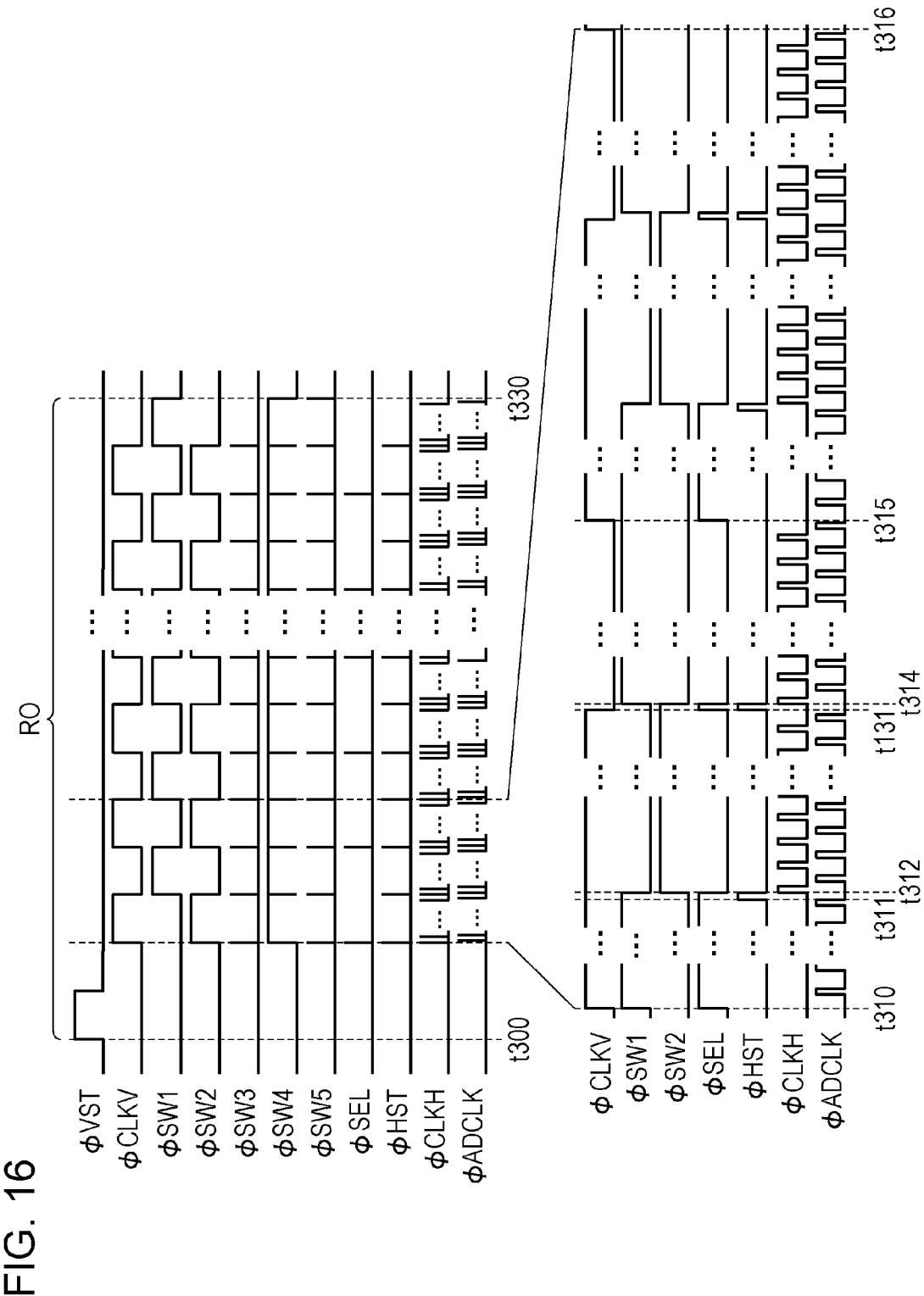
FIG. 16 is a timing chart illustrating a control is an imaging apparatus according to the third embodiment.

According to this embodiment, the signals φSW1 and φSW2 are controlled as illustrated in FIG. 16. However, when the signal φSEL has a high level, any one of the signals φSW1 and φSW2 may be changed to have a high level.

According to this embodiment, the fifth switch M54 is not provided in FIG. 15 but may be provided if it can be controlled to keep an ON state at all times. In this case, if the fifth switch M54 has an ON resistance equal to those of the first switch M50 and second switch M51, the substrate can be designed in consideration of offset current in the differential amplifier 107.

Other Embodiments

Embodiment (s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment (s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (PAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-091611 filed Apr. 28, 2016, which is hereby incorporated by reference herein in its entirety.

What is claimed is:

1. An imaging apparatus comprising:
   a plurality of pixels arranged in a matrix form, the plurality of pixels each being configured to generate an electric signal depending on radiation or light, and each being configured such that the electric signal can be read out nondestructively;
   an output amplifier configured to sequentially output electric signals read out nondestructively from the plurality of pixels; and
   a control unit configured to, in a period when electric signals for one frame of image data are being read out nondestructively from the plurality of pixels, execute nondestructive readout processing a plurality of times for reading out electric signals nondestructively from pixels in a first row included is the plurality of pixels, and execute nondestructive readout processing a plurality of times for reading out electric signals nondestructively from pixels in a second row adjacent to the first row,
   wherein the control unit resets the output amplifier in a period when the nondestructive readout processing is performed a plurality of times on the pixels of the first row.

2. The imaging apparatus according to claim 1, wherein the control unit resets the output amplifier in response to an instruction to start second and subsequent nondestructive readout processing of the plurality of nondestructive readout processing on the pixels of the first row.

3. The imaging apparatus according to claim 1,
   wherein the control unit has a row-selection circuit configured to select the plurality of pixels row by row, a column-selection circuit configured. to select the plurality of pixels column by column, and control circuit configured to control the row-selection circuit, the column-selection circuit, and the output amplifier; and
   wherein, in a period when the row-selection circuit is selecting pixels of the one row, the control circuit resets the output amplifier during a period from a time when the column-selection circuit performs an $a^{th}$ selection on a pixel of the last column for performing the ath selection on the pixel of the one row last to a time when the column-selection circuit performs an $(a+1)^{th}$ selection on a pixel of a first column for first performing the $(a+1)^{th}$ selection on the pixel of the one row, where a is a natural number equal to or higher than 1.

4. The imaging apparatus according to claim 3,
   wherein the control circuit is configured to output a row-selection start signal for causing the row-selection circuit to start selection of pixels of the one row and a column-selection start signal for causing the column-selection circuit to start selection of the plurality of pixels column by column;

the column-selection circuit starts first selection on a plurality of pixels of the one row in response to the first column-selection start signal in response to the row-selection start signal, and starts the $(a+1)^{th}$ selection in response to the $(a+1)^{th}$ column-selection start signal in response to the row-selection start signal; and the control circuit resets the output amplifier in response to the $(a+1)^{th}$ column-selection start signal.

5. The imaging apparatus according to claim 1, wherein the output amplifier is reset by supplying a reference voltage to an input of the output amplifier to fix an output of the output amplifier.

6. The imaging apparatus according to claim 5, wherein the reference voltage is substantially equal to electric signals read out from the plurality of pixels when the radiation or light is irradiated to the plurality of pixels.

7. The imaging apparatus according to claim 5, further comprising a voltage supply unit configured to supply the reference voltage.

8. The imaging apparatus according to claim 7, wherein the plurality of pixels are provided on an imaging substrate having a single crystal semiconductor, and
the output amplifier is provided on a circuit substrate different from the imaging substrate.

9. The imaging apparatus according to claim 8, wherein the voltage supply unit is electrically connected between the imaging substrate and the circuit substrate.

10. The imaging apparatus according to claim 8, wherein the voltage supply unit is provided on the imaging substrate and is electrically connected between the plurality of pixels and the output amplifier.

11. The imaging apparatus according to claim 8, wherein the plurality of pixels each has a converting unit configured to convert radiation or light to charges, an amplifying unit configured to amplify the charges, and a holding unit configured to hold a signal acquired by amplifying, by the amplifying unit, the charges converted by the converting unit.

12. The imaging apparatus according to claim 11, wherein the holding unit has a first holding unit configured to hold a first signal acquired by amplifying, by the unit, charges converted by the converting unit having a first sensitivity, a second holding unit configured to hold a second signal acquired by amplifying, by the amplifying unit, charges converted by the converting unit having a second sensitivity different from the first sensitivity, and a third holding unit configured to hold an offset signal of the amplifying unit.

13. The imaging apparatus according to claim 12, wherein the output amplifier is a differential amplifier, the imaging apparatus further comprising:
a first switch configured to input the first signal to an inverting input terminal of the differential amplifier when the first switch is brought into a conductive state;
a second switch configured to input the second signal to the inverting input terminal when the second switch is brought into a conductive state;
a third switch configured to input the reference voltage to the inverting input terminal when the third switch is brought into a conductive state;
a fourth switch configured to input the offset signal to a non-inverting input terminal of the differential amplifier when the fourth switch is brought into a conductive state; and
a fifth switch configured to input the reference voltage to the non-inverting input terminal when the fifth switch is brought into a conductive state.

14. The imaging apparatus according to claim 11, wherein the conversion element includes a wavelength conversion element configured to convert the radiation to light and a photoelectric conversion element configured to convert the light to the charges.

15. The imaging apparatus according to claim 8,
wherein the circuit substrate includes an A/D converter configured to convert the electric signal, being an analog signal output from the output amplifier, to a digital signal, and a correction unit configured to supply a correction voltage for correcting an offset component of the output amplifier and the AID converter based on the digital signal from the A/D converter to an input of the output amplifier; and
wherein the control circuit controls to inhibit the voltage supply unit from supplying the reference voltage in a case where the correction unit outputs the correction voltage.

16. A radiographic imaging system comprising:
the imaging apparatus according to claim 1;
a processing device configured to process a signal from the imaging apparatus; and
a radiation generator configured to generate radiation to the imaging apparatus.

* * * * *